(12) United States Patent
Nias et al.

(10) Patent No.: US 9,222,521 B2
(45) Date of Patent: Dec. 29, 2015

(54) TORQUE LIMITING TOLERANCE RING

(71) Applicant: Saint-Gobain Performance Plastics Rencol Limited, Coventry (GB)

(72) Inventors: Benjamin Nias, Bristol (GB); Andrew Robert Slayne, Bristol (GB); James Pennsiriwongse, Bristol (GB); Paul Haines, Bristol (GB); Llewelyn Pickering, Wales (GB); Stuart Kelly, Bath (GB); Simon Alan Hughes, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 0 days.

(21) Appl. No.: 14/106,155

(22) Filed: Dec. 13, 2013

(65) Prior Publication Data

US 2014/0166423 A1 Jun. 19, 2014

Related U.S. Application Data

(60) Provisional application No. 61/737,798, filed on Dec. 16, 2012.

(51) Int. Cl.
*F16D 7/02* (2006.01)
*F16D 7/04* (2006.01)
*F16D 1/08* (2006.01)

(52) U.S. Cl.
CPC ............. *F16D 7/04* (2013.01); *F16D 1/0835* (2013.01); *F16D 7/021* (2013.01)

(58) Field of Classification Search
CPC .......... F16D 1/0835; F16D 7/021; F16D 7/04

USPC .............. 464/30, 37, 41; 403/371, 372
See application file for complete search history.

(56) References Cited

U.S. PATENT DOCUMENTS 2,255,742 A * 9/1941 Schilling ................. 464/41
3,061,386 A   10/1962 Dix et al.
(Continued)

FOREIGN PATENT DOCUMENTS

EP   1146239 A2   10/2001
EP   1886895 A1    2/2008
(Continued)

OTHER PUBLICATIONS

International Search Report for PCT/EP2013/076701, dated Mar. 28, 2014, 1 page.

*Primary Examiner* — Gregory Binda
(74) *Attorney, Agent, or Firm* — Abel Law Group, LLP; Chi Suk Kim

(57) ABSTRACT

A torque limiting tolerance ring that is configured to be installed between an inner component and an outer component is disclosed. The torque limiting tolerance ring can include a generally cylindrical body that can have a sidewall. The sidewall can include an unformed section and a plurality of projections can extend from the unformed section of the sidewall. The projections can be configured to engage the inner component or the outer component. During use, the torque limiting tolerance ring can move from an engaged configuration, in which the inner component is statically coupled to the outer component, to a disengaged configuration, in which the inner component is disengaged from the outer component.

8 Claims, 20 Drawing Sheets

(56) References Cited

U.S. PATENT DOCUMENTS

| | | | |
|---|---|---|---|
| 3,424,287 | A | * 1/1969 | Dreiding |
| 4,311,224 | A | 1/1982 | Kato et al. |
| 4,981,390 | A | 1/1991 | Cramer, Jr. et al. |
| 6,755,746 | B2 | 6/2004 | Barnley et al. |
| 7,580,225 | B2 | 8/2009 | Hanrahan et al. |
| 7,958,637 | B2 | 6/2011 | Hughes |
| 8,852,004 | B2 * | 10/2014 | D'Silva |
| 2013/0324345 | A1 | 12/2013 | Asakura et al. |

FOREIGN PATENT DOCUMENTS

| | | | | |
|---|---|---|---|---|
| GB | 661643 | * | 11/1951 | 464/37 |
| SU | 1571326 | A1 * | 6/1990 | 464/41 |
| WO | 2012121018 | A1 | 9/2012 | |

* cited by examiner

TORQUE LIMITING TOLERANCE RING

CROSS-REFERENCE TO RELATED APPLICATION

The present application claims priority from U.S. Provisional Patent Application No. 61/737,798, filed Dec. 16, 2012, entitled "TORQUE LIMITING TOLERANCE RING", naming as inventors Benjamin Nias, Andrew Robert Slayne, James Pennsiriwongse, Paul Haines, Llewelyn Pickering, Stuart Kelly and Simon Alan Hughes, which application is incorporated by reference herein in its entirety.

FIELD OF THE DISCLOSURE

The present disclosure is directed generally to tolerance rings, and particularly to torque limiting tolerance rings.

DESCRIPTION OF THE RELATED ART

The present disclosure relates to tolerance ring assemblies, wherein a tolerance ring provides an interference fit between parts of an assembly, in which a first part has a cylindrical portion located in a cylindrical bore of a second part. In particular, the present disclosure relates to assemblies having a tolerance ring that provides an interference fit between a cylindrical component such as a shaft and an outer component installed around the shaft.

Improved engineering techniques have resulted in the need for greater accuracy of machine parts, raising manufacturing costs. Very close tolerances are required where press fits, splines, pins or keyways are employed to transmit torque in applications such as pulleys, flywheels or driveshafts.

Tolerance rings may be used to provide an interference fit between parts required to transmit torque. Tolerance rings provide a low cost means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions, or projections, can extend radially outwards from the ring, or radially inwards towards the center of the ring. Usually, the protrusions are formations, possibly regular formations, such as corrugations, ridges or waves.

When the ring is located within an annular space between, for example, a shaft and a bore in an outer component installed on the shaft, the protrusions are compressed. Each protrusion can act as a spring and can exert a radial force against the shaft and the surface of the bore, providing an interference fit between the shaft and the housing. Rotation of the housing or the shaft will produce similar rotation in the other of the shaft or the housing, as torque is transmitted by the tolerance ring. Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring. The term "shaft" as used hereafter includes any assembly component with a cylindrical portion, such as a shaft or a bearing.

Accordingly, the industry continues to need improvements in tolerance rings, particularly in tolerance rings that can be used to couple a rotating shaft and an outer component installed on the rotating shaft.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

Figure 1:
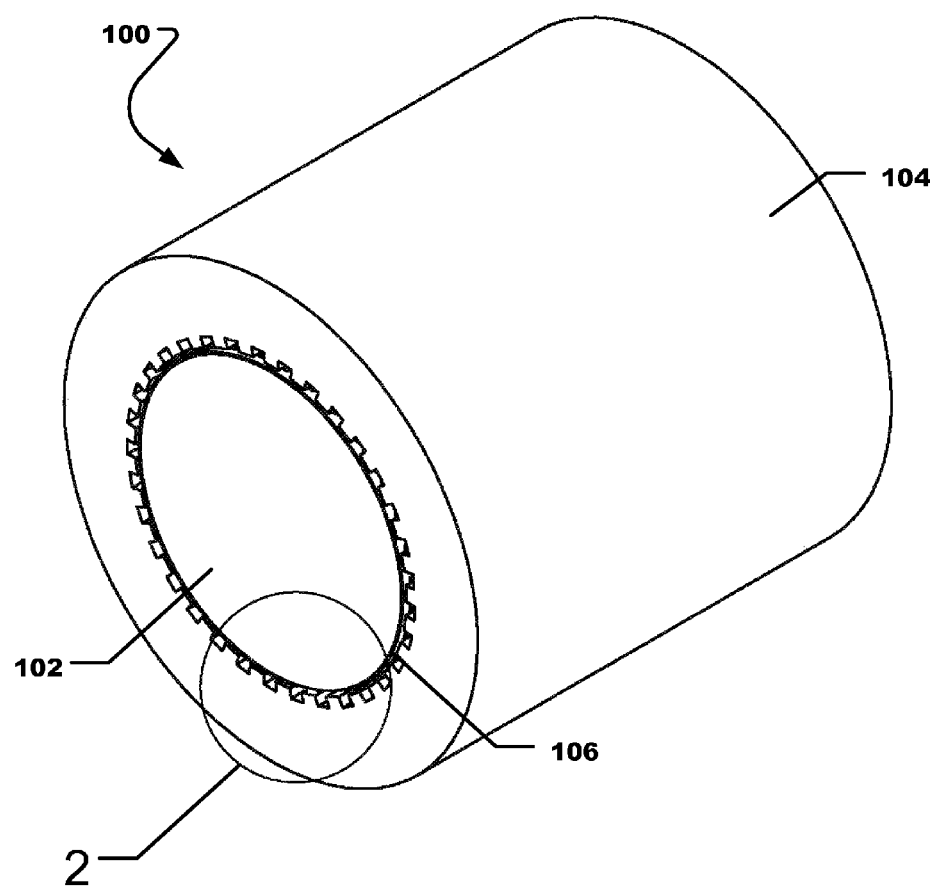
FIG. 1 includes a perspective view of a rotating assembly in an engaged configuration in accordance with an embodiment.
Figure 2:
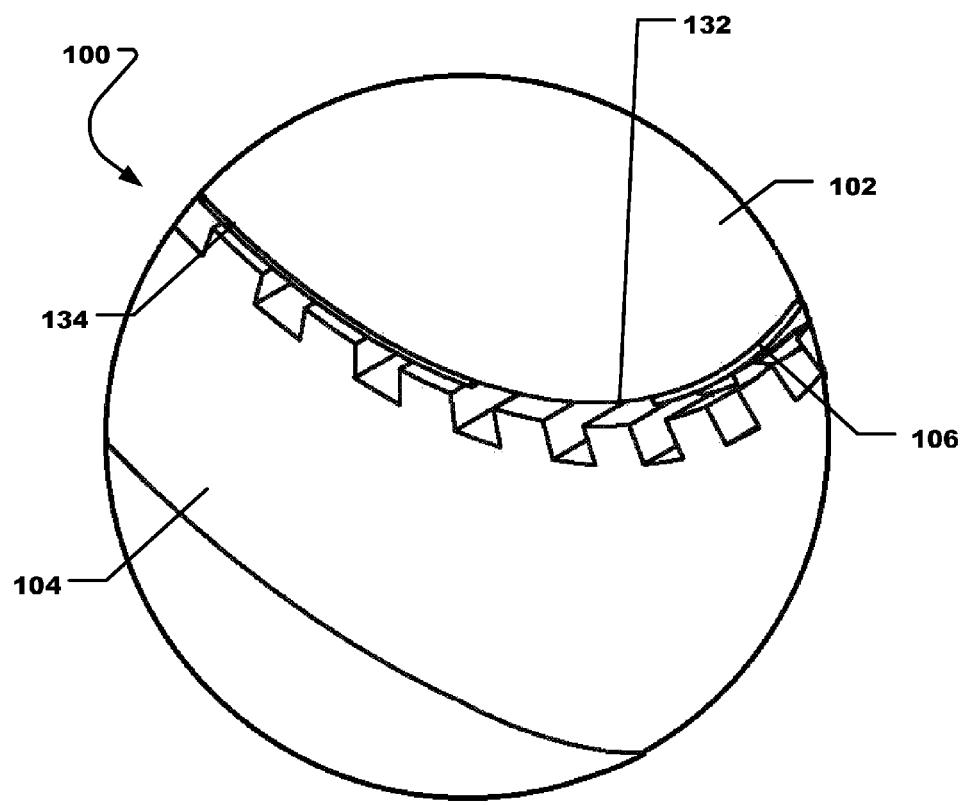
FIG. 2 includes a detailed view, taken at Circle 2 in FIG. 1, of the rotating assembly in the engaged configuration in accordance with an embodiment.
Figure 3:
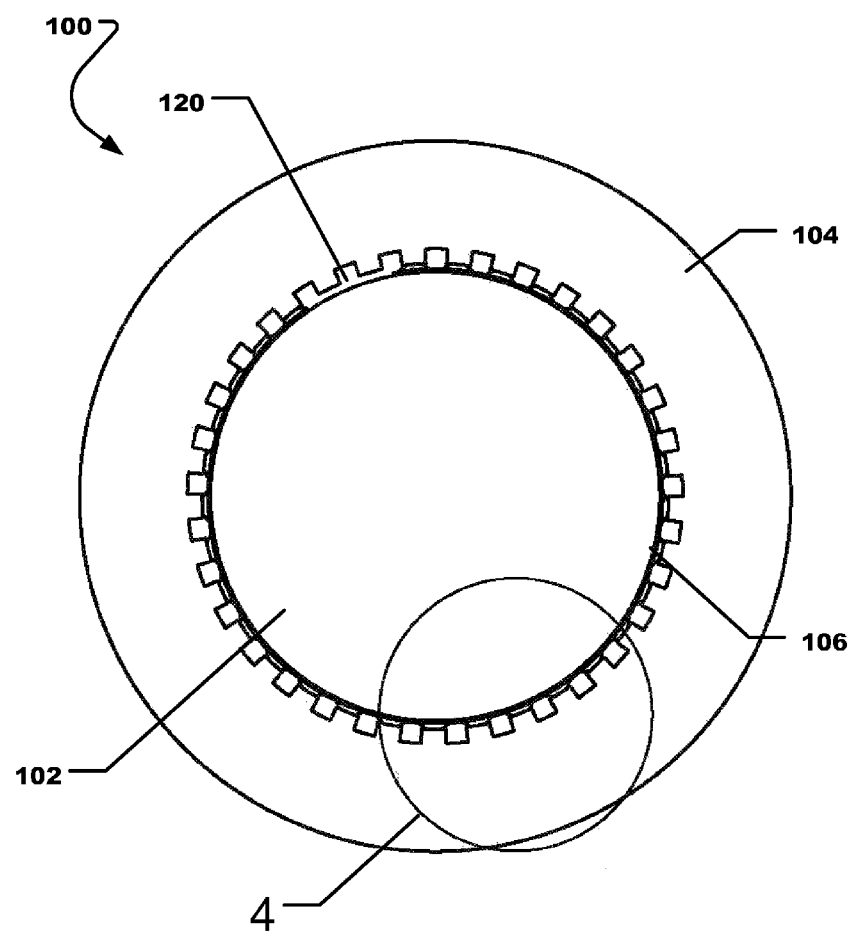
FIG. 3 includes an end plan view of the rotating assembly in the engaged configuration in accordance with an embodiment.
Figure 4:
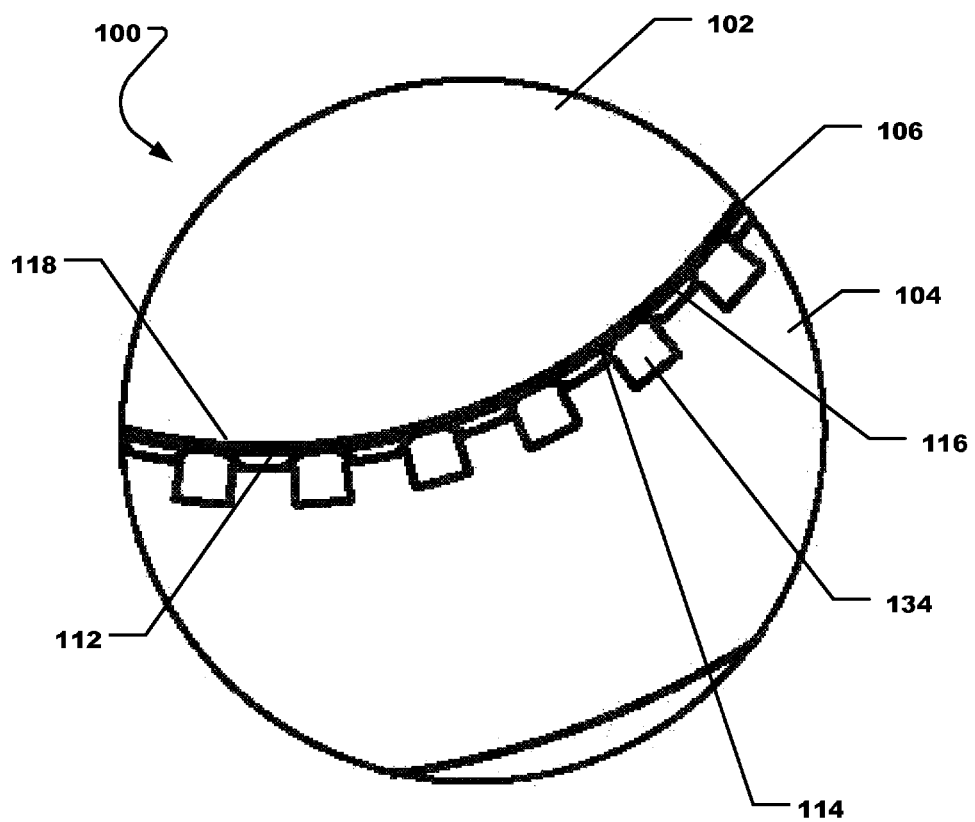
FIG. 4 includes a detailed view, taken at Circle 4 in FIG. 3, of the rotating assembly in the engaged configuration in accordance with an embodiment.
Figure 5:
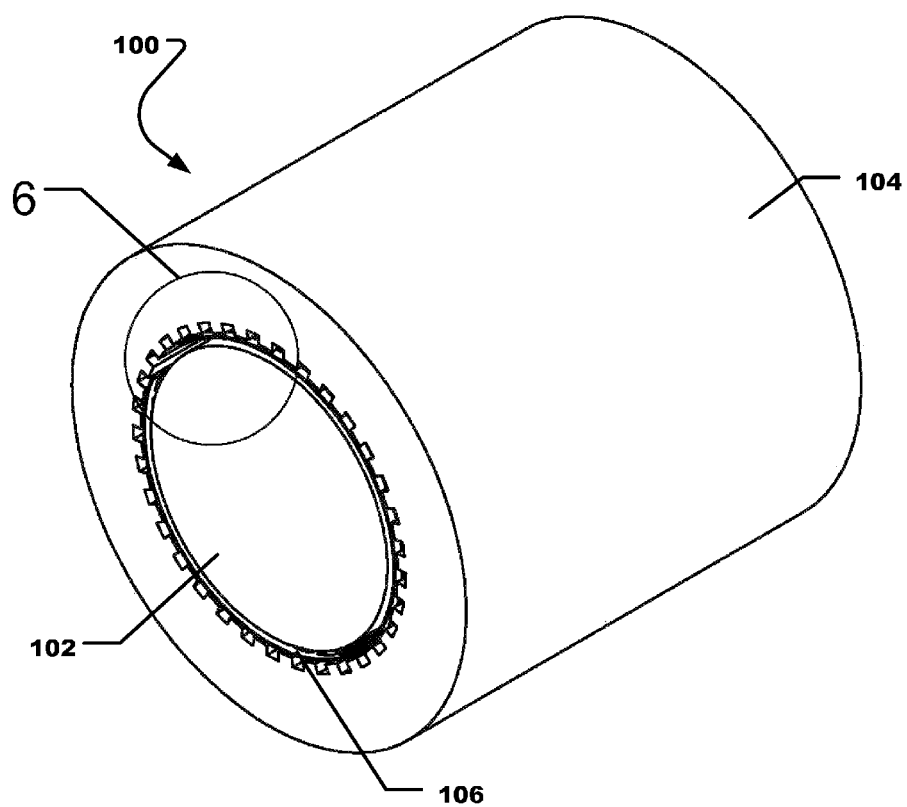
FIG. 5 includes a perspective view of the rotating assembly in a disengaged configuration in accordance with an embodiment.
Figure 6:
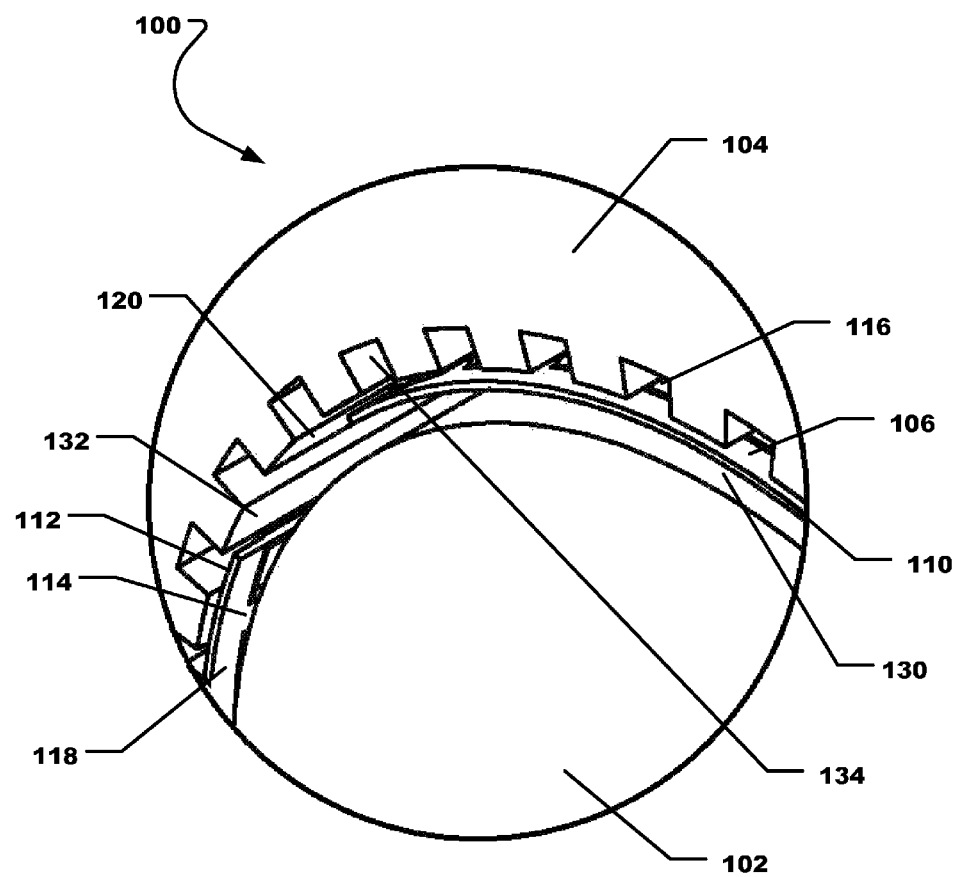
FIG. 6 includes a detailed view, taken at Circle 6 in FIG. 5, of the rotating assembly in the disengaged configuration in accordance with an embodiment.
Figure 7:
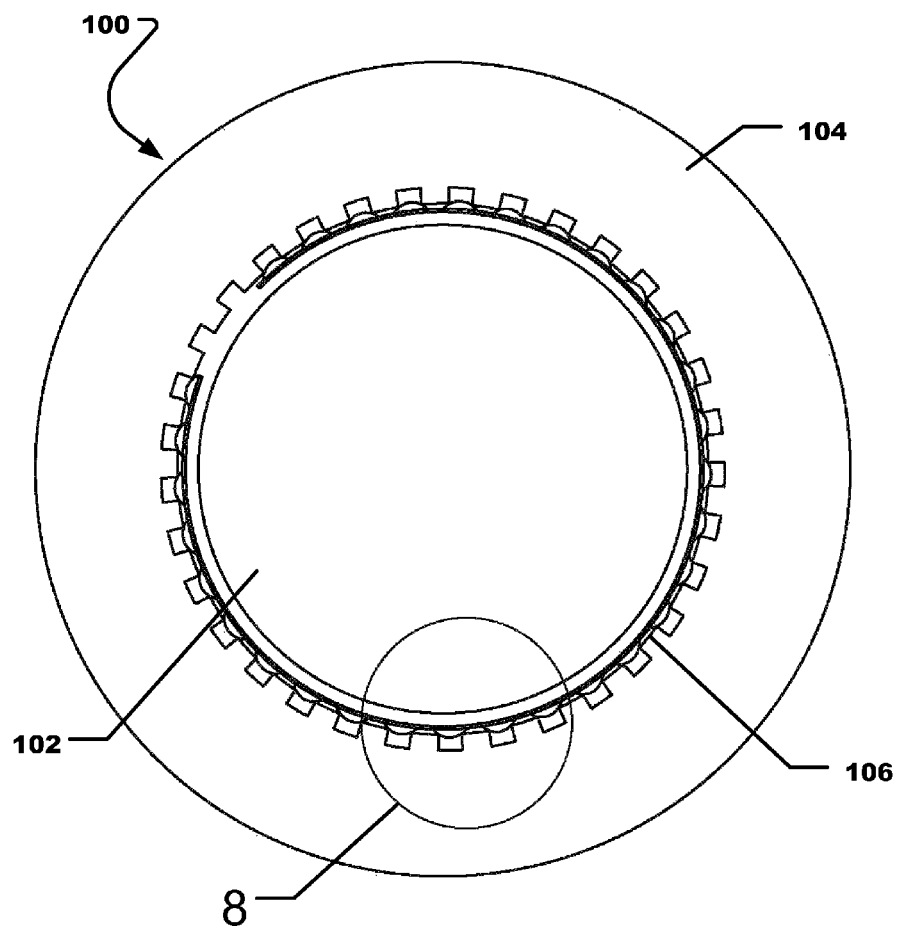
FIG. 7 includes an end plan view of the rotating assembly in the disengaged configuration in accordance with an embodiment.
Figure 8:
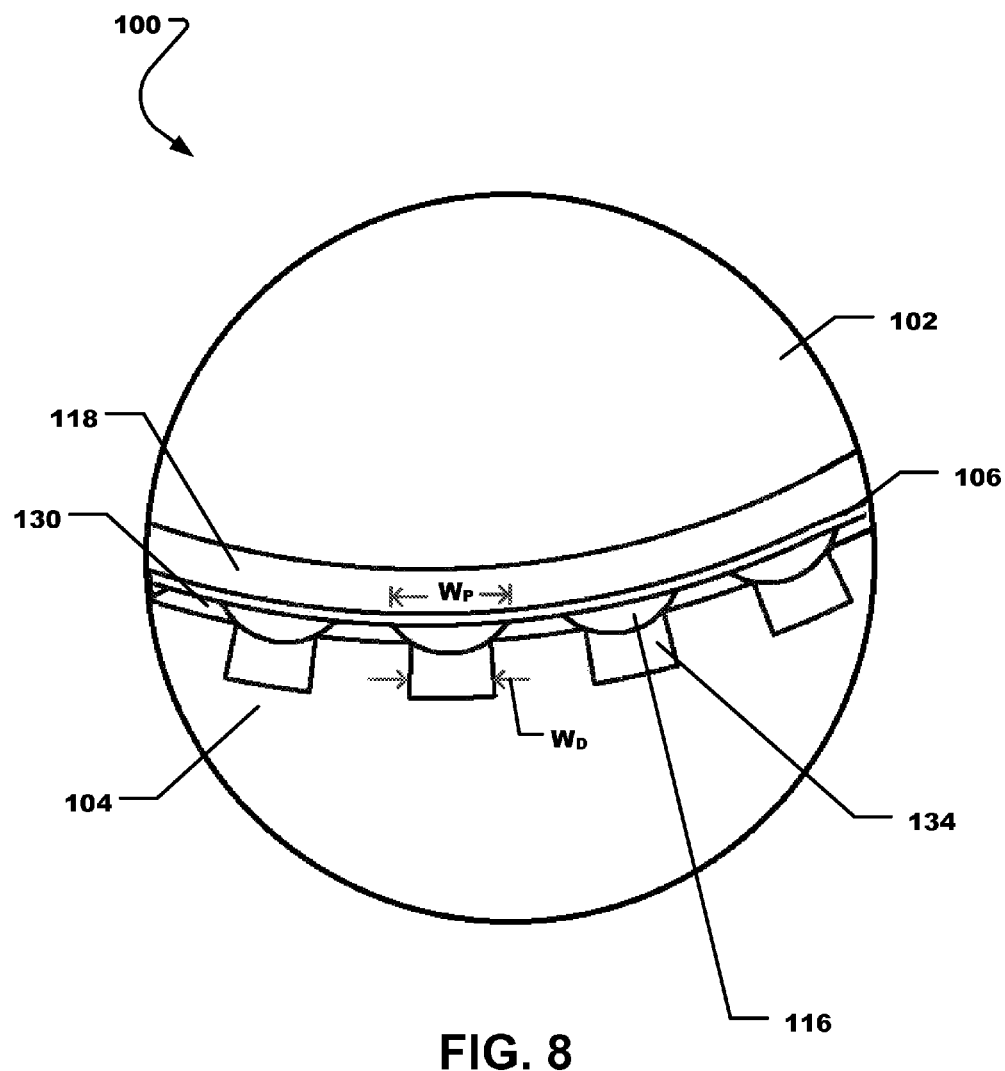
FIG. 8 includes a detailed view, taken at Circle 8 in FIG. 7, of the rotating assembly in the disengaged configuration in accordance with an embodiment.
Figure 9:
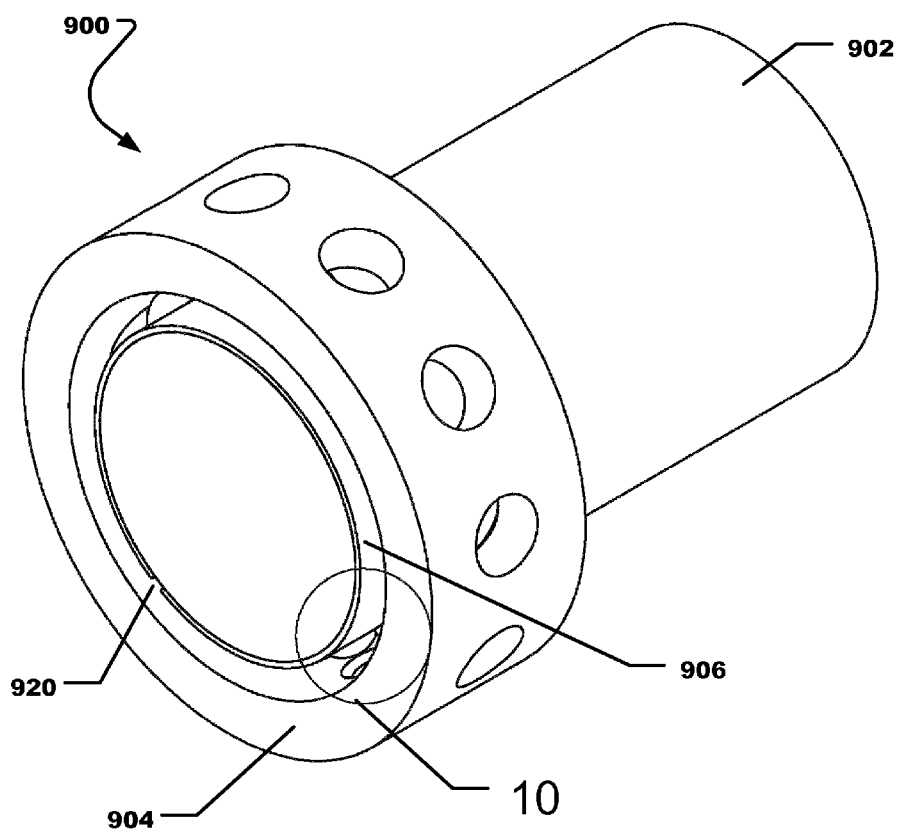
FIG. 9 includes a perspective view of a rotating assembly in an engaged configuration in accordance with another embodiment.
Figure 10:
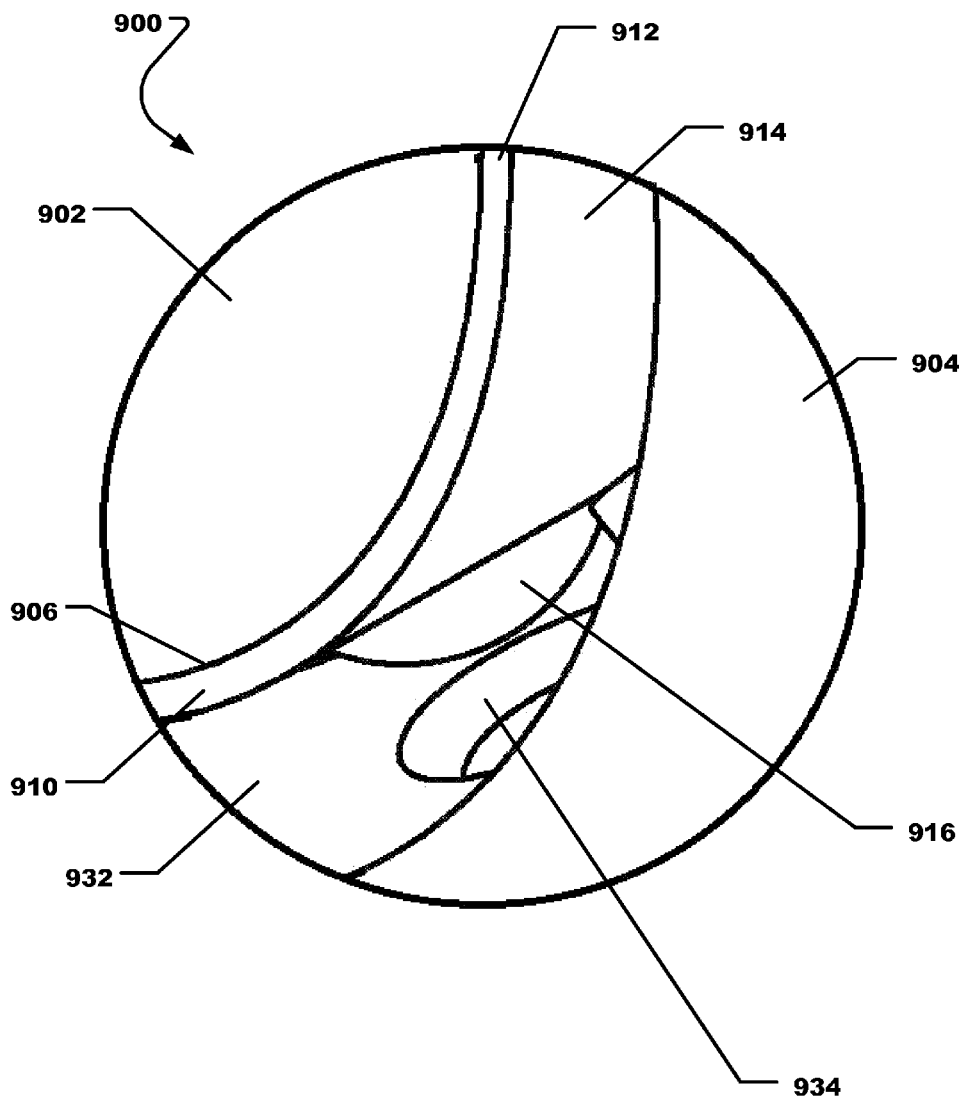
FIG. 10 includes a detailed view, taken at Circle 10 in FIG. 9, of the rotating assembly in the engaged configuration in accordance with another embodiment.
Figure 11:
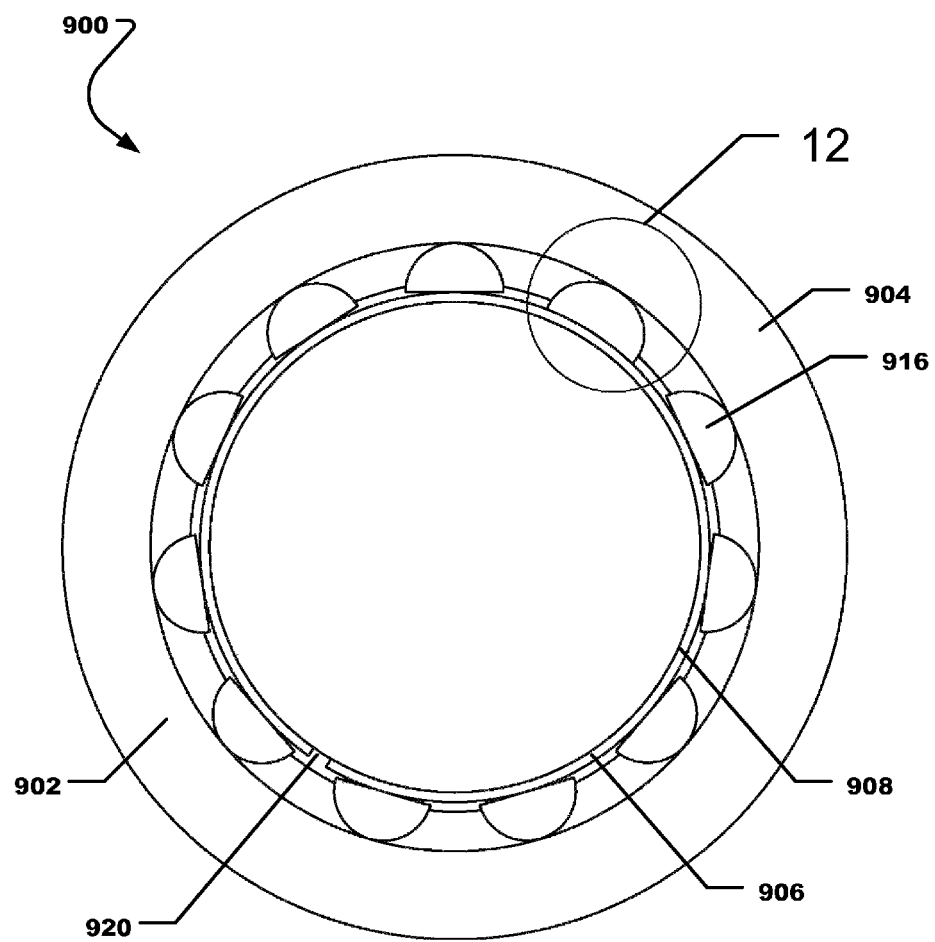
FIG. 11 includes an end plan view of the rotating assembly in the engaged configuration in accordance with another embodiment.
Figure 12:
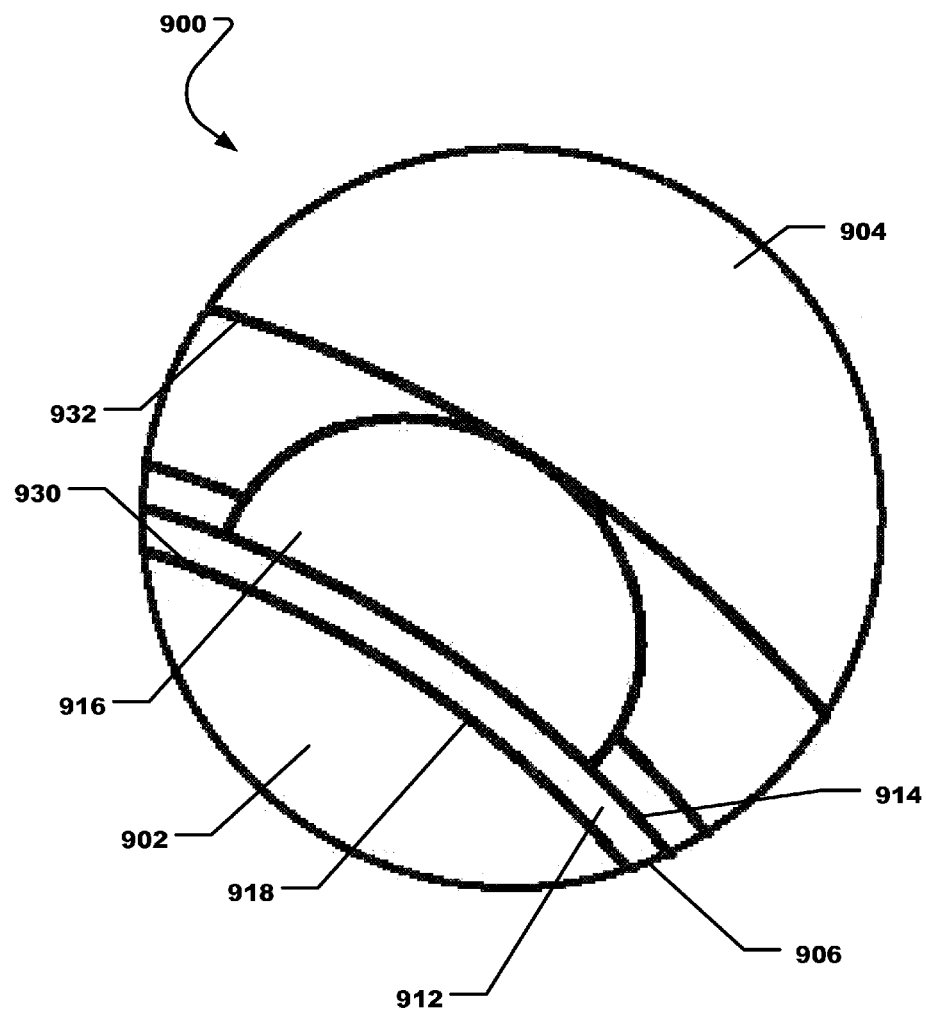
FIG. 12 includes a detailed view, taken at Circle 12 in FIG. 11, of the rotating assembly in the engaged configuration in accordance with another embodiment.
Figure 13:
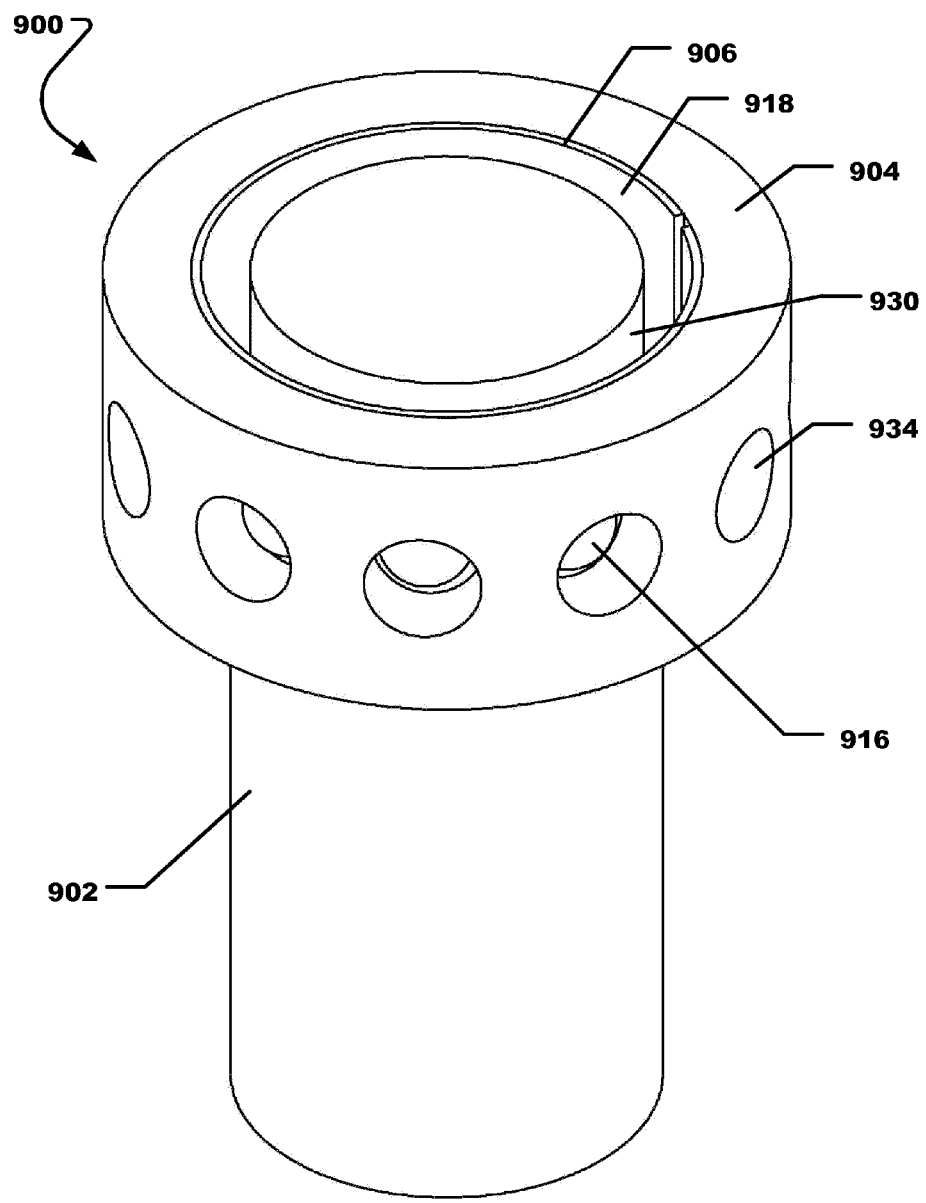
FIG. 13 includes a perspective view of the rotating assembly in a disengaged configuration in accordance with another embodiment.
Figure 14:
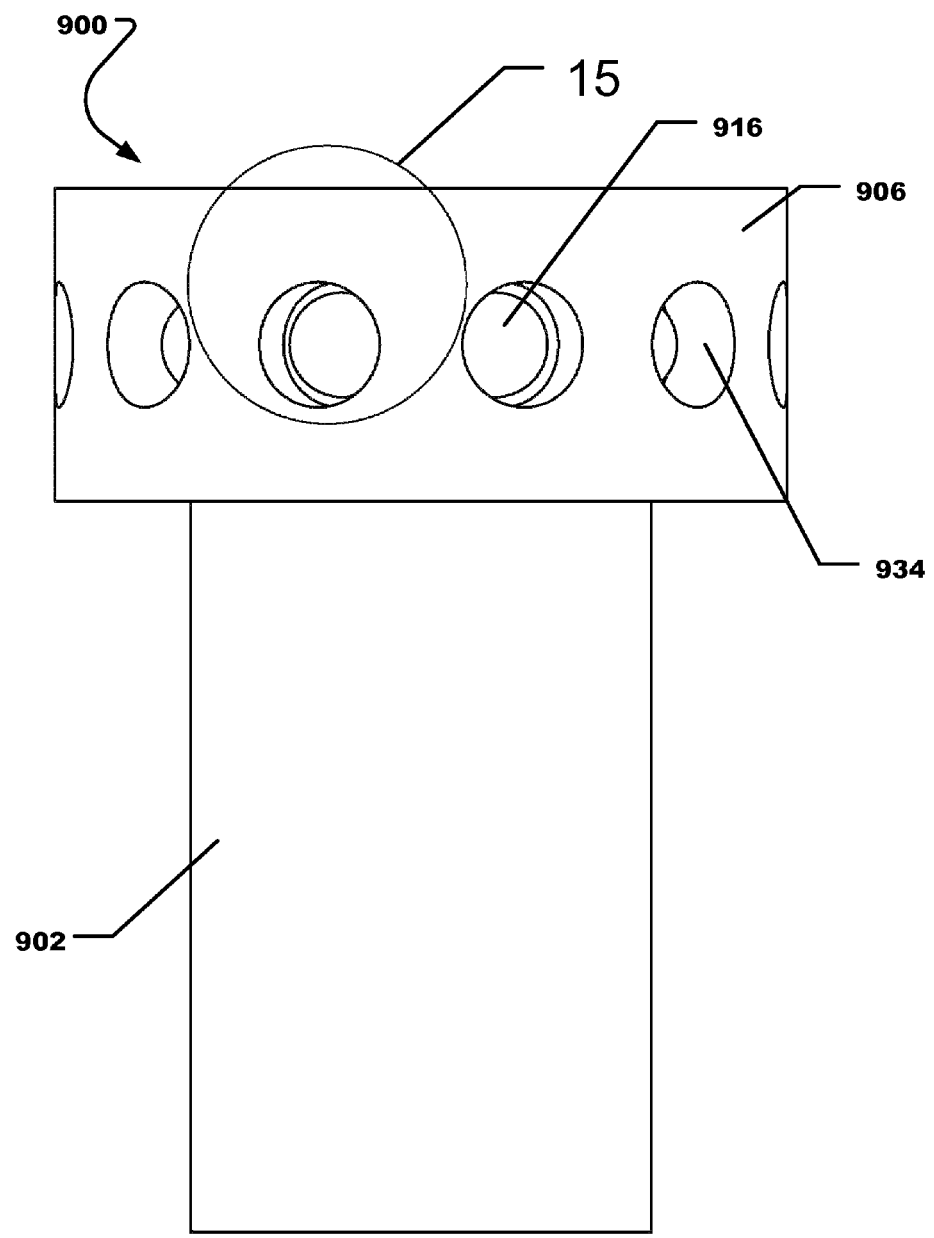
FIG. 14 includes a side plan view of the rotating assembly in the disengaged configuration in accordance with another embodiment.
Figure 15:
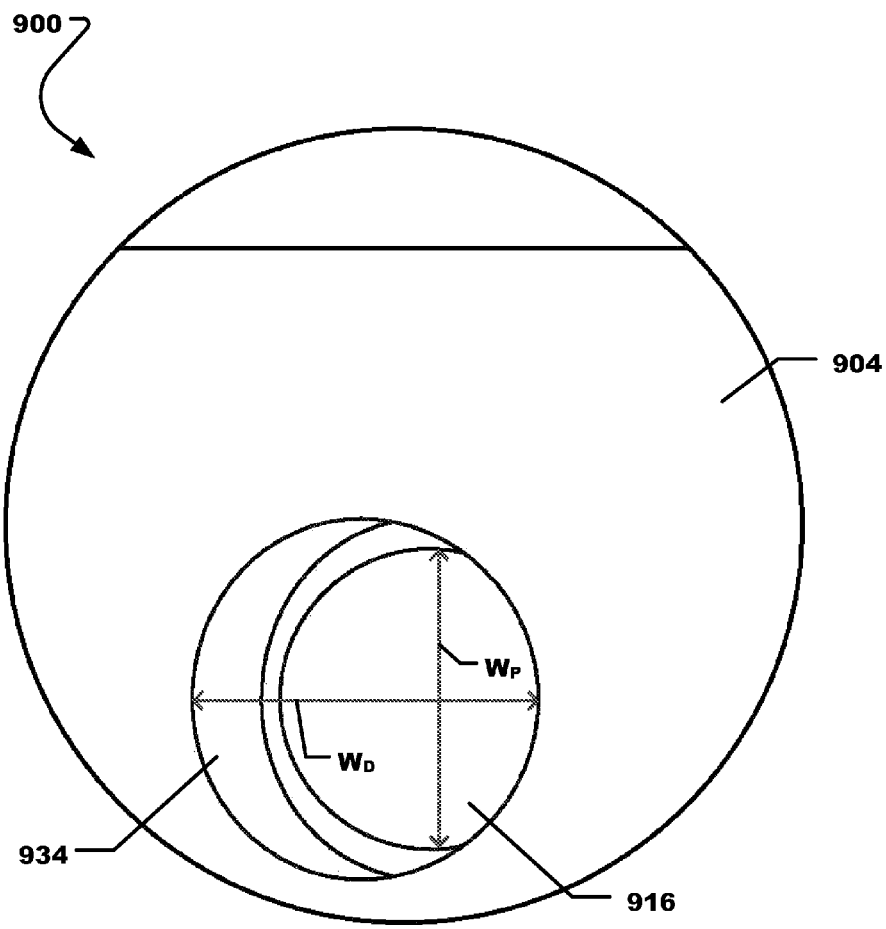
FIG. 15 includes a detailed view, taken at Circle 15 in FIG. 14, of the rotating assembly in the disengaged configuration in accordance with another embodiment.
Figure 16:
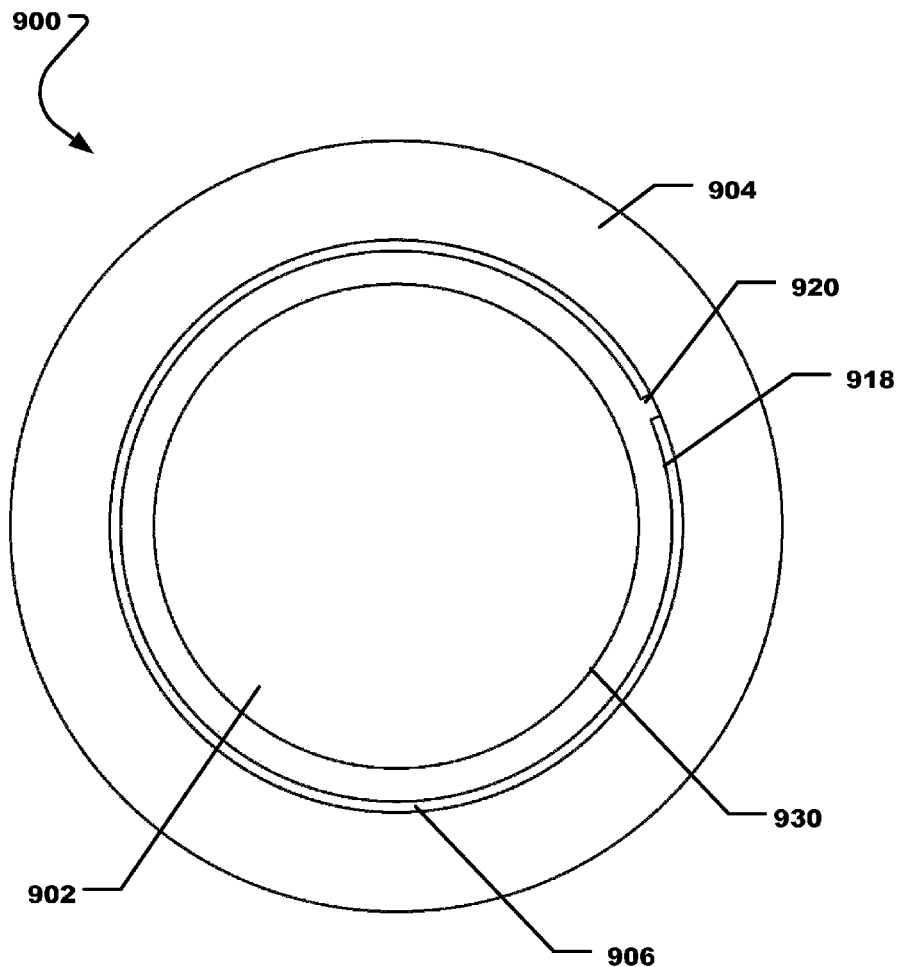
FIG. 16 includes an end plan view of the rotating assembly in the disengaged configuration in accordance with another embodiment.

The following description is directed to tolerance rings, and particularly, to torque limiting tolerance rings that can be installed within an air conditioner compressor assembly between a compressor shaft and a bore formed in a compressor pulley. In one aspect, a tolerance ring can be fitted around the compressor shaft and then, the compressor pulley can be installed around the torque limiting tolerance ring. Alternatively, the torque limiting tolerance ring can be inserted into the bore formed in the pulley and the compressor shaft can be inserted through the torque limiting tolerance ring.

In a typical tolerance ring, the tolerance ring can provide an interference fit between an inner and an outer component. As such, the inner and outer components can be statically coupled and can rotate together. If a torque between the inner and outer component becomes greater than the force of the interference fit, the inner and outer components can rotate with respect to each other. When the torque between the inner and outer components falls below the force of the interference fit, the two parts can re-engage each other. In the case in which the inner component is a shaft and the shaft seizes, e.g., due to a bearing failure, the outer component can continue to rotate on the shaft. As the outer component continues to rotate, the friction between the outer component and the tolerance ring, or between the shaft and the tolerance ring, can generate high heat. Continued movement can lead to permanent damage to the shaft, the outer component, the tolerance ring, or all three components.

A torque limiting tolerance ring according to one or more of the embodiments described herein can include a plurality of projections that can extend radially inward, radially outward, or both radially inward and radially outward from the body of the torque limiting tolerance ring. The torque limiting tolerance ring can be installed over a splined shaft or within a spline collar. If the spline shaft or the splined collar rotates with respect to the torque limiting tolerance ring, the projections can be aligned with the splines and the torque limiting tolerance ring can contract radially inward or expand radially outward. This expansion or contraction of the torque limiting tolerance ring can disengage, or decouple, the shaft from the collar and the two can rotate freely with respect to each other without generating heat. As such, the risk of damage to the shaft or the collar can be substantially reduced.

Referring to FIG. 1 through FIG. 8, a rotating assembly is shown and is generally designated 100. The rotating assembly 100 can include an inner component 102 and an outer component 104. A torque limiting tolerance ring 106 can be installed there between. During use, and described in greater detail below, the torque limiting tolerance ring 106 can move from an engaged configuration, illustrated in FIG. 1 through FIG. 4, in which the inner component 102 is statically coupled to the outer component 104, to a disengaged configuration, illustrated in FIG. 5 through FIG. 8, in which the inner component 102 is disengaged from the outer component 104.

In a particular aspect, the rotating assembly 100 can be an air conditioner compressor assembly, e.g., a belt driven air conditioner compressor assembly for a motor vehicle. Further, in this particular aspect, the inner component 102 can be a compressor shaft extending from an air conditioner compressor and the outer component 104 can be a compressor pulley installed around the compressor shaft. A drive belt (not shown) can extend at least partially around the outer circumference of the compressor pulley.

As the belt moves, the compressor pulley can rotate. In the engaged configuration, with the compressor shaft statically coupled to the compressor pulley, the compressor shaft can also rotate. In the event of a failure within the air compressor, e.g., a bearing seizure, and the compressor shaft can seize within the air compressor and stop rotating. If the shaft seizes, a torque within the compressor shaft/compressor pulley assembly can exceed a threshold torque and the torque limiting tolerance ring can move from the engaged configuration to the disengaged configuration by rotating angularly within the compressor shaft/compressor pulley assembly. In the disengaged configuration, the compressor pulley can rotate freely around the seized compressor shaft.

Accordingly, with the assembly disengaged, or decoupled, the drive belt can continue to move without a substantial increase in excessive heat or friction between the compressor pulley, the compressor shaft, and the drive belt that would likely occur if the compressor pulley remained statically engaged with the seized compressor shaft while the belt continued moving around the seized compressor pulley or it the belt continued to drive the compressor pulley around the shaft without the compressor pulley fully disengaged from the shaft. As such, the risk of damage to the drive belt, the compressor pulley, or other components driving the belt or being driven by the drive belt, can be substantially reduced. The compressor pulley can remain disengaged from the compressor shaft even if the motor vehicle is shut down and the drive belt stops moving. When the motor vehicle is subsequently started, there is little or no residual torque between the compressor shaft and the compressor pulley to be overcome by an engine drive shaft moving the drive belt.

As illustrated in FIG. 1 through FIG. 8, the torque limiting tolerance ring 106 can include a generally cylindrical body 110. The body 110 can include a sidewall 112. The sidewall 112 can include an unformed section 114 and a plurality of projections 116 can extend radially outwardly from the sidewall 112 of the body 110. The sidewall 112 of the body 110 can include a generally cylindrical inner surface 118 free from projections. The sidewall 112 can also include a gap 120 in the unformed section 114. In a particular aspect, the gap 120 can extend along a majority of the entire axial length of the body 110 to establish at least a partial split in the body 110. In another aspect, the gap 120 can extend along the entire axial length of the body 110 to establish at least a complete split in the body 110.

Further, as depicted in FIG. 1 through FIG. 8, the inner component 102 can be generally cylindrical and can include a generally cylindrical outer surface 130 and the outer component 104 can include a generally cylindrical bore having a generally cylindrical inner surface 132. As illustrated, the inner surface 132 of the outer component 104 can be formed with a plurality of voids 134 that are equally spaced around the circumference of the inner surface 132. In this aspect, the voids 134 can be splines formed in the inner surface 132 of the outer component 104 along the entire axial length of the outer component 104. The voids 134 can extend radially into the inner surface 132 of the outer component 104 away from a center of the outer component 104. Further, the voids 134 can be substantially parallel to an axis of rotation of the rotating assembly 100 extending through the center of the rotating assembly 100.

In this aspect, the projections 116 can extend radially outward from the unformed section 114 of the sidewall 112 of the body 110 away from a center of the rotating assembly 100 toward the voids 134 formed in the inner surface 132 of the outer component 104. Moreover, each projection 116 can be generally elongated and can include an axial height that is greater than a circumferential width at the widest portion of each projection 116. In another aspect, each projection 116 can be column of multiple discrete projections that can be aligned along the same axis and the overall axial height of the column can be greater than a circumferential width at the widest portion of each discrete projection in the column.

In the engaged configuration, illustrated in FIG. 1 through FIG. 4, the plurality of projections 116 can engage the inner cylindrical surface 132 of the outer component 104, e.g., the portions of the inner cylindrical surface 132 located between each void 134. The inner surface 118 of the sidewall 112 of the body 110 can engage the outer surface 130 of the inner component 102. Moreover, each projection 116 can be compressed between the outer surface 130 of the inner component 102 and the inner surface 132 of the outer component 104 and can provide a plurality of radially directed forces that can statically couple the inner component 102 and the outer component 104 so the outer component 104 can rotate with the inner component 102.

In a particular aspect, each projection 116 can include a stiffness, $S_P$, that can allow each projection 116 to be compressed, but not permanently deformed in the engaged configuration. $S_P$ can be ≥500 kN/mm, such as ≥1000 kN/mm, ≥5000 kN/mm, or ≥10000 kN/mm. Moreover, $S_P$ can be ≤500000 kN/mm, such as ≤250000 kN/mm, ≤100000 kN/mm, or ≤50000 kN/mm. $S_P$ can be within a range between and including any of the maximum or minimum values of $S_P$ described herein.

For example, $S_P$ can be ≥500 kN/mm and ≤500000 kN/mm, such as ≥500 kN/mm and ≤250000 kN/mm, ≥500 kN/mm and ≤100000 kN/mm, or ≥500 kN/mm and ≤50000 kN/mm. In another aspect, $S_P$ can be ≥1000 kN/mm and ≤500000 kN/mm, such as ≥1000 kN/mm and ≤250000 kN/mm, ≥1000 kN/mm and ≤100000 kN/mm, or ≥1000 kN/mm and ≤50000 kN/mm. Further, $S_P$ can be ≥5000 kN/mm and ≤500000 kN/mm, such as ≥5000 kN/mm and ≤250000 kN/mm, ≥5000 kN/mm and ≤100000 kN/mm, or ≥5000 kN/mm and ≤50000 kN/mm. In yet another aspect, $S_P$ can be ≥10000 kN/mm and ≤500000 kN/mm, such as ≥10000 kN/mm and ≤250000 kN/mm, ≥10000 kN/mm and ≤100000 kN/mm, or ≥10000 kN/mm and ≤50000 kN/mm.

In the disengaged configuration, depicted in FIG. 5 through FIG. 8, the plurality of projections 116 can extend at least partially into the voids 134 formed in the inner surface 132 of the outer component 104 and the torque limiting tolerance ring 106 can expand radially outward. Specifically, each projection 116 can extend at least partially into a respective void 134 aligned therewith in the disengaged configuration. In a particular aspect, as the torque limiting tolerance ring 106 expands radially outward, the inner surface 118 of the sidewall 112 of the body 110 can disengage the outer surface 130 of the inner component 102 and the inner surface 118 of the sidewall 112 can be radially spaced from the outer surface 130 of the inner component 102 around at least a majority of the circumference of the outer surface 130 of the inner component 102. In a particular aspect, a toroid of space can be formed around outer surface 130 of the inner component 102 and contact between the outer surface 130 of the inner component 102 and the inner surface 118 of the sidewall 112 of the torque limiting tolerance ring 106 can be limited.

In a particular aspect, the torque limiting tolerance ring 106 can have a first diameter, $d_1$, in the engaged configuration and a second diameter, $d_2$, in the disengaged configuration. In this aspect, $d_1$ is different than $d_2$. Specifically, $d_2$ can be ≥$d_1$. For example, $d_2 \geq 101\% \, d_1$, such as ≥102% $d_1$, ≥103% $d_1$, ≥104% $d_1$, or ≥105% $d_1$. Further, $d_2 \leq 130\% \, d_1$, such as ≤125% $d_1$, ≤120% $d_1$, ≤115% $d_1$, or ≤110% $d_1$. In this aspect, $d_2$ can be within a range between and including any of the maximum and minimum values of $d_2$ described herein.

For example, $d_2$ can be ≥101% $d_1$ and ≤130% $d_1$, such as ≥101% $d_1$ and ≤125% $d_1$, ≥101% $d_1$ and ≤120% $d_1$, ≥101% $d_1$ and ≤115% $d_1$, or ≥101% $d_1$ and ≤110% $d_1$. Further, $d_2$ can be ≥102% $d_1$ and ≤130% $d_1$, such as ≥102% $d_1$ and ≤125% $d_1$, ≥102% $d_1$ and ≤120% $d_1$, ≥102% $d_1$ and ≤115% $d_1$, or ≥102% $d_1$ and ≤110% $d_1$. In another aspect, $d_2$ can be ≥103% $d_1$ and ≤130% $d_1$, such as ≥103% $d_1$ and ≤125% $d_1$, ≥103% $d_1$ and ≤120% $d_1$, ≥103% $d_1$ and ≤115% $d_1$, or ≥103% $d_1$ and ≤110% $d_1$. Moreover, $d_2$ can be ≥104% $d_1$ and ≤130% $d_1$, such as ≥104% $d_1$ and ≤125% $d_1$, ≥104% $d_1$ and ≤120% $d_1$, ≥104% $d_1$ and ≤115% $d_1$, or ≥104% $d_1$ and ≤110% $d_1$. In another aspect, $d_2$ can be ≥105% $d_1$ and ≤130% $d_1$, such as ≥105% $d_1$ and ≤125% $d_1$, ≥105% $d_1$ and ≤120% $d_1$, ≥105% $d_1$ and ≤115% $d_1$, or ≥105% $d_1$ and ≤110% $d_1$.

In another particular aspect, the unformed section 114 of the sidewall 112 of the torque limiting tolerance ring 106 can include a restoring force, $F_{RSW}$, that can bias the torque limiting tolerance ring 106 radially outward from the engaged configuration to the disengaged configuration when the projections 116 move into alignment with the voids 134. $F_{RSW}$ can be ≥5 N, such as ≥10 N, ≥15 N, or ≥20 N/m. Further, $F_{RSW}$ can be ≤50 N, such as ≤45 N, ≤40 N, or ≤35 N. $F_{RSW}$ can be within a range between and including any of the maximum and minimum values of $F_{RSW}$ described herein.

For example, $F_{RSW}$ can be ≥5 N and ≤50 N, such as ≥5 N and ≤45 N, ≥5 N and ≤40 N, or ≥5 N and ≤35 N. $F_{RSW}$ can be ≥10 N and ≤50 N, such as ≥10 N and ≤45 N, ≥10 N and ≤40 N, or ≥10 N and ≤35 N. Moreover, $F_{RSW}$ can be ≥15 N and ≤50 N, such as ≥15 N and ≤45 N, ≥15 N and ≤40 N, or ≥15 N and ≤35 N. Additionally, $F_{RSW}$ can be ≥20 N and ≤50 N, such as ≥20 N and ≤45 N, ≥20 N and ≤40 N, or ≥20 N and ≤35 N.

In a particular aspect, the torque limiting tolerance ring 106 can slip and rotate within the outer component and move to the disengaged configuration if an operating torque, $T_O$, within the rotating assembly exceeds a threshold torque, $T_T$. Further, in the disengaged configuration since the torque limiting tolerance ring 106 is radially distanced from the inner component 102, a residual torque, $T_R$, acting on the inner component or the outer component can be ≤15% $T_T$, such as ≤12.5% $T_T$, ≤10% $T_T$, ≤7.5% $T_T$, ≤5% $T_T$, ≤2.5% $T_T$, or ≤1% $T_T$. Moreover, $T_R$ can be ≥0% $T_T$, such as ≥0.025% $T_T$, ≥0.05% $T_T$, ≥0.1 $T_T$, ≥0.25% $T_T$, or ≥0.5% $T_T$. $T_R$ can be within a range between and including any of the maximum and minimum values of $T_R$ described herein.

For example, $T_R$ can be ≤15% $T_T$ and ≥0% $T_T$, such as ≤15% $T_T$ and ≥0.025% $T_T$, ≤15% $T_T$ and ≥0.05% $T_T$, ≤15% $T_T$ and ≥0.1 $T_T$, ≤15% $T_T$ and ≥0.25% $T_T$, or ≤15% $T_T$ and ≥0.5% $T_T$. $T_R$ can be ≤12.5% $T_T$ and ≥0% $T_T$, such as ≤12.5% $T_T$ and ≥0.025% $T_T$, ≤12.5% $T_T$ and ≥0.05% $T_T$, ≤12.5% $T_T$ and ≥0.1 $T_T$, ≤12.5% $T_T$ and ≥0.25% $T_T$, or ≤15% $T_T$ and ≥0.5% $T_T$. Further, $T_R$ can be ≤10% $T_T$ and ≥0% $T_T$, such as ≤10% $T_T$ and ≥0.025% $T_T$, ≤10% $T_T$ and ≥0.05% $T_T$, ≤10% $T_T$ and ≥0.1 $T_T$, ≤10% $T_T$ and ≥0.25% $T_T$, or ≤10% $T_T$ and ≥0.5% $T_T$. $T_R$ can be ≤7.5% $T_T$ and ≥0% $T_T$, such as ≤7.5% $T_T$ and ≥0.025% $T_T$, ≤7.5% $T_T$ and ≥0.05% $T_T$, ≤7.5% $T_T$ and ≥0.1 $T_T$, ≤7.5% $T_T$ and ≥0.25% $T_T$, or ≤7.5% $T_T$ and ≥0.5% $T_T$. In another aspect, $T_R$ can be ≤5% $T_T$ and ≥0% $T_T$, such as ≤5% $T_T$ and ≥0.025% $T_T$, ≤5% $T_T$ and ≥0.05% $T_T$, ≤5% $T_T$ and ≥0.1 $T_T$, ≤5% $T_T$ and ≥0.25% $T_T$, or ≤5% $T_T$ and ≥0.5% $T_T$. $T_R$ can be ≤2.5% $T_T$ and ≥0% $T_T$, such as ≤2.5% $T_T$ and ≥0.025% $T_T$, ≤2.5% $T_T$ and ≥0.05% $T_T$, ≤2.5% $T_T$ and ≥0.1 $T_T$, ≤2.5% $T_T$ and ≥0.25% $T_T$, or ≤2.5% $T_T$ and ≥0.5% $T_T$. In addition, $T_R$ can be ≤1% $T_T$ and ≥0% $T_T$, such as ≤1% $T_T$ and ≥0.025% $T_T$, ≤1% $T_T$ and ≥0.05% $T_T$, ≤1% $T_T$ and ≥0.1 $T_T$, ≤1% $T_T$ and ≥0.25% $T_T$, or ≤1% $T_T$ and ≥0.5% $T_T$.

In a particular aspect, once the projections 116 extending from the torque limiting tolerance ring 106 move into and engage the voids 134 formed in the outer component 106, the projections 116 cannot easily move out of the voids 134 and the torque limiting tolerance ring 106 can remain in the disengaged configuration after the torque limiting tolerance ring moves from the engaged configuration to the disengaged configuration.

Each void 134 can include a volume, $V_D$, measured within the space bound by one or more inner surfaces of the void 134. Each projection 116 can occupy a volume, $V_P$, measured within the space bound by one or more outer surfaces of the projection 116 and $V_P$ can be ≤$V_D$. In a particular aspect, $V_P$ can be ≤99% $V_D$, such as ≤98% $V_D$, ≤97% $V_D$, ≤96% $V_D$, or ≤95% $V_D$. Further, $V_P$ can be ≥20% $V_D$, such as ≥30% $V_D$, ≥40% $V_D$, ≥50% $V_D$, or ≥75% $V_D$. $V_P$ can be within a range between and including any of the maximum and minimum values of $V_P$ described herein.

For example, $V_P$ can be ≤99% $V_D$ and ≥20% $V_D$, such as ≤99% $V_D$ and ≥30% $V_D$, ≤99% $V_D$ and ≥40% $V_D$, ≤99% $V_D$ and ≥50% $V_D$, or ≤99% $V_D$ and ≥75% $V_D$. $V_P$ can be ≤98% $V_D$ and ≥20% $V_D$, such as ≤98% $V_D$ and ≥30% $V_D$, ≤98% $V_D$ and ≥40% $V_D$, ≤98% $V_D$ and ≥50% $V_D$, or ≤98% $V_D$ and ≥75% $V_D$. Further, $V_P$ can be ≤97% $V_D$ and ≥20% $V_D$, such as ≤97% $V_D$ and ≥30% $V_D$, ≤97% $V_D$ and ≥40% $V_D$, ≤97% $V_D$ and ≥50% $V_D$, or ≤97% $V_D$ and ≥75% $V_D$. In another aspect, $V_P$ can be ≤96% $V_D$ and ≥20% $V_D$, such as ≤96% $V_D$ and ≥30% $V_D$, ≤96% $V_D$ and ≥40% $V_D$, ≤96% $V_D$ and ≥50% $V_D$, or ≤96% $V_D$ and ≥75% $V_D$. Still further, $V_P$ can be ≤95% $V_D$ and ≥20% $V_D$, such as ≤95% $V_D$ and ≥30% $V_D$, ≤95% $V_D$ and ≥40% $V_D$, ≤95% $V_D$ and ≥50% $V_D$, or ≤95% $V_D$ and ≥75% $V_D$.

In another aspect, each void 134 can include a circumferential width, $W_D$, measured at a widest portion of each void 134. Each projection 116 can also include a circumferential width, $W_P$, measured at a widest portion of each projection the projection and $W_P$ can be ≤$W_D$. For example, $W_P$ can be ≤99% $W_D$, such as ≤98% $W_D$, ≤97% $W_D$, ≤96% $W_D$, or ≤95% $W_D$. Further, $W_P$ can be ≥50% $W_D$, such as ≥60% $W_D$, ≥70% $W_D$, or ≥80% $W_D$. $W_P$ can be within a range between and including any of the maximum and minimum values of $W_P$ described herein.

For example, $W_P$ can be ≤99% $W_D$ and ≥50% $W_D$, such as ≤99% $W_D$ and ≥60% $W_D$, ≤99% $W_D$ and ≥70% $W_D$, or ≤99% $W_D$ and ≥80% $W_D$. $W_P$ can be ≤98% $W_D$ and ≥50% $W_D$, such as ≤98% $W_D$ and ≥60% $W_D$, ≤98% $W_D$ and ≥70% $W_D$, or ≤98% $W_D$ and ≥80% $W_D$. Moreover, $W_P$ can be ≤97% $W_D$ and ≥50% $W_D$, such as ≤97% $W_D$ and ≥60% $W_D$, ≤97% $W_D$ and ≥70% $W_D$, or ≤97% $W_D$ and ≥80% $W_D$. $W_P$ can be ≤96% $W_D$ and ≥50% $W_D$, such as ≤96% $W_D$ and ≥60% $W_D$, ≤96% $W_D$ and ≥70% $W_D$, or ≤96% $W_D$ and ≥80% $W_D$. Additionally, $W_P$ can be ≤95% $W_D$ and ≥50% $W_D$, such as ≤95% $W_D$ and ≥60% $W_D$, ≤95% $W_D$ and ≥70% $W_D$, or ≤95% $W_D$ and ≥80% $W_D$.

In another aspect, $W_P$ can be ≥$W_D$. For example, $W_P$ can be ≥101% $W_D$, such as ≥102% $W_D$, ≥103% $W_D$, ≥104% $W_D$, or ≥105% $W_D$. Further, $W_P$ can be ≤125% $W_D$, such as ≤120% $W_D$, or ≤115% $W_D$. $W_P$ can be within a range between and including any of the maximum and minimum values of $W_P$ described herein.

For example, $W_P$ can be ≥101% $W_D$ and ≤125% $W_D$, such as ≥101% $W_D$ and ≤120% $W_D$, or ≥101% $W_D$ and ≤115% $W_D$. $W_P$ can be ≥102% $W_D$ and ≤125% $W_D$, such as ≥102% $W_D$ and ≤120% $W_D$, or ≥102% $W_D$ and ≤115% $W_D$. Further, $W_P$ can be ≥103% $W_D$ and ≤125% $W_D$, such as ≥103% $W_D$ and ≤120% $W_D$, or ≥103% $W_D$ and ≤115% $W_D$. Still further, $W_P$ can be ≥104% $W_D$ and ≤125% $W_D$, such as ≥104% $W_D$ and ≤120% $W_D$, or ≥104% $W_D$ and ≤115% $W_D$. Moreover, $W_P$ can be ≥105% $W_D$ and ≤125% $W_D$, such as ≥105% $W_D$ and ≤120% $W_D$, or ≥105% $W_D$ and ≤115% $W_D$.

Referring now to FIG. 9 through FIG. 16, another embodiment of a rotating assembly is shown and is generally designated 900. As illustrated, the rotating assembly 900 can include an inner component 902, an outer component 904, and a torque limiting tolerance ring 906 installed there between. During use, and described in greater detail below, the torque limiting tolerance ring 906 can be movable from an engaged configuration, illustrated in FIG. 9 through FIG. 12, in which the inner component 902 is statically coupled to the outer component 904, to a disengaged configuration, illustrated in FIG. 13 through FIG. 16, in which the inner component 902 is disengaged from the outer component 904. In a particular aspect, the rotating assembly 900 can be an air conditioner compressor assembly, as described above in conjunction with FIG. 1 through FIG. 8.

As illustrated in FIG. 9 through FIG. 16, the torque limiting tolerance ring 906 can include a generally cylindrical body 910. The body 910 can include a sidewall 912. The sidewall 912 can include an unformed section 914 and a plurality of projections 916 can extend radially outwardly from the sidewall 912 of the body 910. The sidewall 912 of the body 910 can include a generally cylindrical inner surface 918 free from projections. The sidewall 912 can also include a gap 920 in the unformed section 914. In a particular aspect, the gap 920 can extend along a majority of the entire axial length of the body 910 to establish at least a partial split in the body 910. In another aspect, the gap 920 can extend along the entire axial length of the body 910 to establish at least a complete split in the body 910.

Further, as illustrated in FIG. 9 through FIG. 16, the inner component 902 can be generally cylindrical and can include a generally cylindrical outer surface 930 and the outer component 904 can include a generally cylindrical bore having a generally cylindrical inner surface 932. As illustrated, the inner surface 932 of the outer component 904 can be formed with a plurality of voids 934 that are equally spaced around the circumference of the inner surface 932. In this aspect, the voids 934 can be bores machined, or otherwise formed, in the inner surface 932 of the outer component 904. The voids 934 can extend radially into the inner surface 932 of the outer component 904 away from a center of the outer component 904. Further, the voids 934 can be extend partially into the outer component 904 or completely through the outer component 904, as illustrated.

In this aspect, the projections 916 can extend radially outward from the unformed section 914 of the sidewall 912 of the body 910 away from a center of the rotating assembly 900 toward the voids 934 formed in the inner surface 932 of the outer component 904. Moreover, each projection 916 can be generally hemispherical.

In the engaged configuration, illustrated in FIG. 9 through FIG. 12, the plurality of projections 916 can engage the inner cylindrical surface 932 of the outer component 904, e.g., the portions of the inner cylindrical surface 932 located between each void 934. The inner surface 918 of the sidewall 912 of the body 910 can engage the outer surface 930 of the inner component 902. Moreover, each projection 916 can be compressed between the outer surface 930 of the inner component 902 and the inner surface 932 of the outer component 904 and can provide a plurality of radially directed forces that can statically couple the inner component 902 and the outer component 904 so the outer component 904 can rotate with the inner component 902.

In a particular aspect, each projection 916 can include a stiffness, $S_P$, that can allow each projection 916 to be compressed, but not permanently deformed in the engaged configuration. $S_P$ can be the same as $S_P$ described above in conjunction with the embodiment illustrated in FIG. 1 through FIG. 8.

In the disengaged configuration, depicted in FIG. 13 through FIG. 16, the plurality of projections 916 can extend at least partially into the voids 934 formed in the inner surface 932 of the outer component 904 and the torque limiting tolerance ring 906 can expand radially outward. Specifically, each projection 916 can extend at least partially into a respective void 934 aligned therewith in the disengaged configuration. In a particular aspect, as the torque limiting tolerance ring 906 expands radially outward, the inner surface 918 of the sidewall 912 of the body 910 can disengage the outer surface 930 of the inner component 902 and the inner surface 918 of the sidewall 912 can be radially spaced from the outer surface 930 of the inner component 902 around at least a majority of the circumference of the outer surface 930 of the inner component 902. In a particular aspect, a toroid of space can be formed around outer surface 930 of the inner component 902 and contact between the outer surface 930 of the inner component 902 and the inner surface 918 of the sidewall 912 of the torque limiting tolerance ring 906 can be limited.

In a particular aspect, the torque limiting tolerance ring 906 can have a first diameter, $d_1$, in the engaged configuration and a second diameter, $d_2$, in the disengaged configuration. In this aspect, $d_1$ is different than $d_2$. Specifically, $d_2$ can be $\geq d_1$, as described above in conjunction with the embodiment illustrated in FIG. 1 through FIG. 8.

In another particular aspect, the unformed section 914 of the sidewall 912 of the torque limiting tolerance ring 906 can include a restoring force, $F_{RSW}$, that can bias the torque limiting tolerance ring 906 radially outward from the engaged configuration to the disengaged configuration when the projections 916 move into alignment with the voids 934. $F_{RSW}$ can be the same as the restoring force described above in conjunction with the embodiment depicted in FIG. 1 through FIG. 8.

In a particular aspect, the torque limiting tolerance ring 906 can slip and rotate within the outer component and move to the disengaged configuration if an operating torque, $T_O$, within the rotating assembly exceeds a threshold torque, $T_T$. A residual torque, $T_R$, acting on the inner component or the outer component can be the same as the residual torque values described above in conjunction with the embodiment illustrated in FIG. 1 through FIG. 8.

In a particular aspect, once the projections 916 extending from the torque limiting tolerance ring 906 move into and engage the voids 934 formed in the outer component 904, the projections 916 cannot easily move out of the voids 934 and the torque limiting tolerance ring 906 can remain in the disengaged configuration after the torque limiting tolerance ring moves from the engaged configuration to the disengaged configuration.

In a particular aspect, each void 934 can include a volume, $V_D$, measured within the space bound by one or more inner surfaces of the void 934. Each projection 916 can occupy a volume, $V_P$, measured within the space bound by one or more outer surfaces of the projection 916 and $V_P$ can be $\leq V_D$, as described above in conjunction with the embodiment illustrated in FIG. 1 through FIG. 8.

In another aspect, each void 934 can include a circumferential width, or diameter, $W_D$, measured at a widest portion of each void 934. Each projection 916 can also include a circumferential width, or diameter, $W_P$, measured at a widest portion of each projection the projection. $W_P$ can be $\leq W_D$, as described above in conjunction with the embodiment illustrated in FIG. 1 through FIG. 8. In another aspect, $W_P$ can be $\geq W_D$, as described above in conjunction with the embodiment illustrated in FIG. 1 through FIG. 8.

Referring now to FIG. 17 through FIG. 20, another embodiment of a rotating assembly is shown and is generally designated 1700. As illustrated, the rotating assembly 1700 can include an inner component 1702, an outer component 1704, and a torque limiting tolerance ring 1706 installed there between. During use, and described in greater detail below, the torque limiting tolerance ring 1706 can move from an engaged configuration, illustrated in FIG. 17 and FIG. 18, in which the inner component 1702 is statically coupled to the outer component 1704, to a disengaged configuration, illustrated in FIG. 19 and FIG. 20, in which the inner component 1702 is disengaged from the outer component 1704. In a particular aspect, the rotating assembly 1700 can be an air conditioner compressor assembly, as described above in conjunction with FIG. 1 through FIG. 8.

As illustrated in FIG. 17 through FIG. 20, the torque limiting tolerance ring 1706 can include a generally cylindrical body 1710. The body 1710 can include a sidewall 1712. The sidewall 1712 can include an unformed section 1714 and a plurality of projections 1716 can extend radially inwardly from the sidewall 1712 of the body 1710. The sidewall 1712 of the body 1710 can include a generally cylindrical outer surface 1718 free from projections. The sidewall 1712 can also include a gap 1720 in the unformed section 1714. In a particular aspect, the gap 1720 can extend along a majority of the entire axial length of the body 1710 to establish at least a partial split in the body 1710. In another aspect, the gap 1720 can extend along the entire axial length of the body 1710 to establish at least a complete split in the body 1710.

Further, as illustrated in FIG. 17 through FIG. 20, the inner component 1702 can be generally cylindrical and can include a generally cylindrical outer surface 1730 and the outer component 1704 be include a generally cylindrical bore having a generally cylindrical inner surface 1732. As illustrated, the outer surface 1730 of the inner component 1702 can be formed with a plurality of voids 1734 that are equally spaced around the circumference of the outer surface 1730. In this aspect, the voids 1734 can be splines formed in the outer surface 1730 of the inner component 1702 along the entire axial length of the inner component 1702. The voids 1734 can extend radially into the outer surface 1730 of the inner component 1702 toward a center of the inner component 1702. Further, the voids 1734 can be substantially parallel to an axis of rotation of the rotating assembly 1700 extending through the center of the rotating assembly 1700.

In this aspect, the projections 1716 can extend radially inward from the unformed section 1714 of the sidewall 1712 of the body 1710 toward the center of the rotating assembly 1700 and toward the voids 1734 formed in the outer surface 1730 of the inner component 1702. Moreover, each projection 1716 can be generally elongated and can include an axial height that is greater than a circumferential width at the widest portion of each projection 1716. In another aspect, each projection 1716 can be column of multiple discrete projections aligned along the same axis and the overall axial height can be greater than a circumferential width at the widest portion of each discrete projection in the column.

Figure 17:
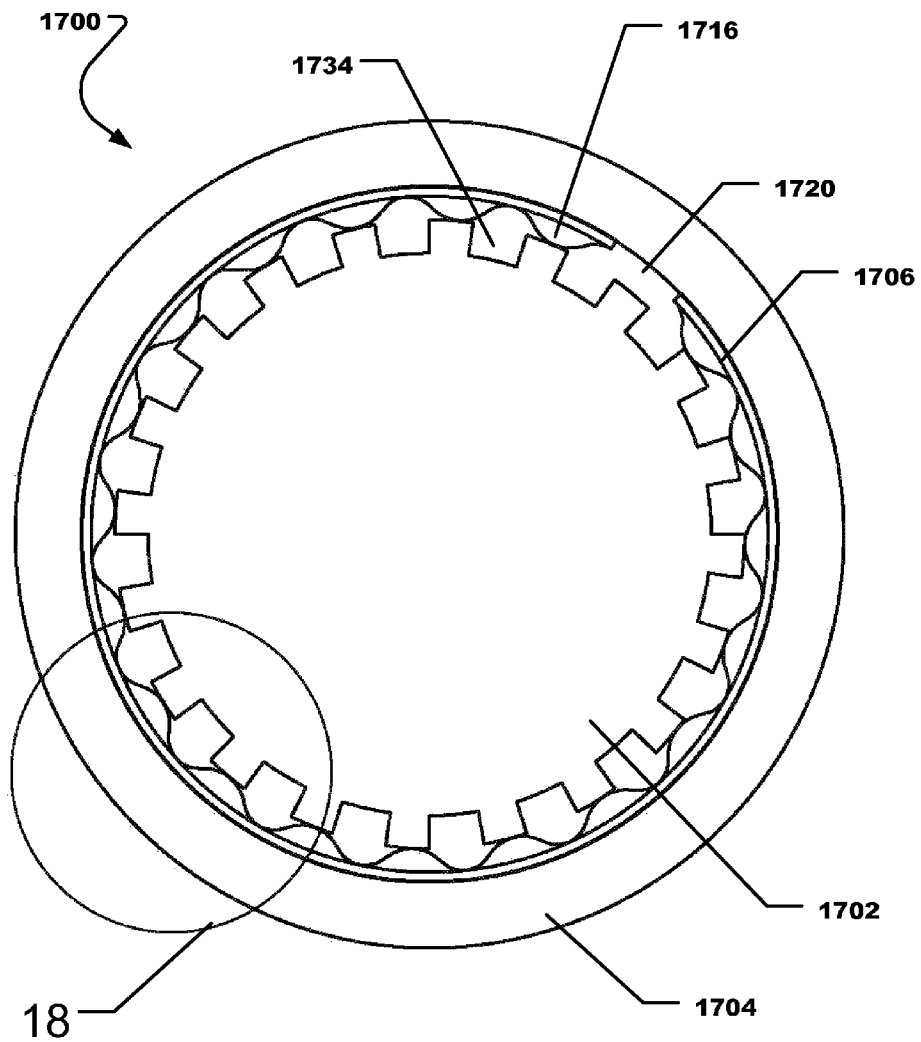
FIG. 17 includes an end plan view of a rotating assembly in an engaged configuration in accordance with yet another embodiment.
Figure 18:
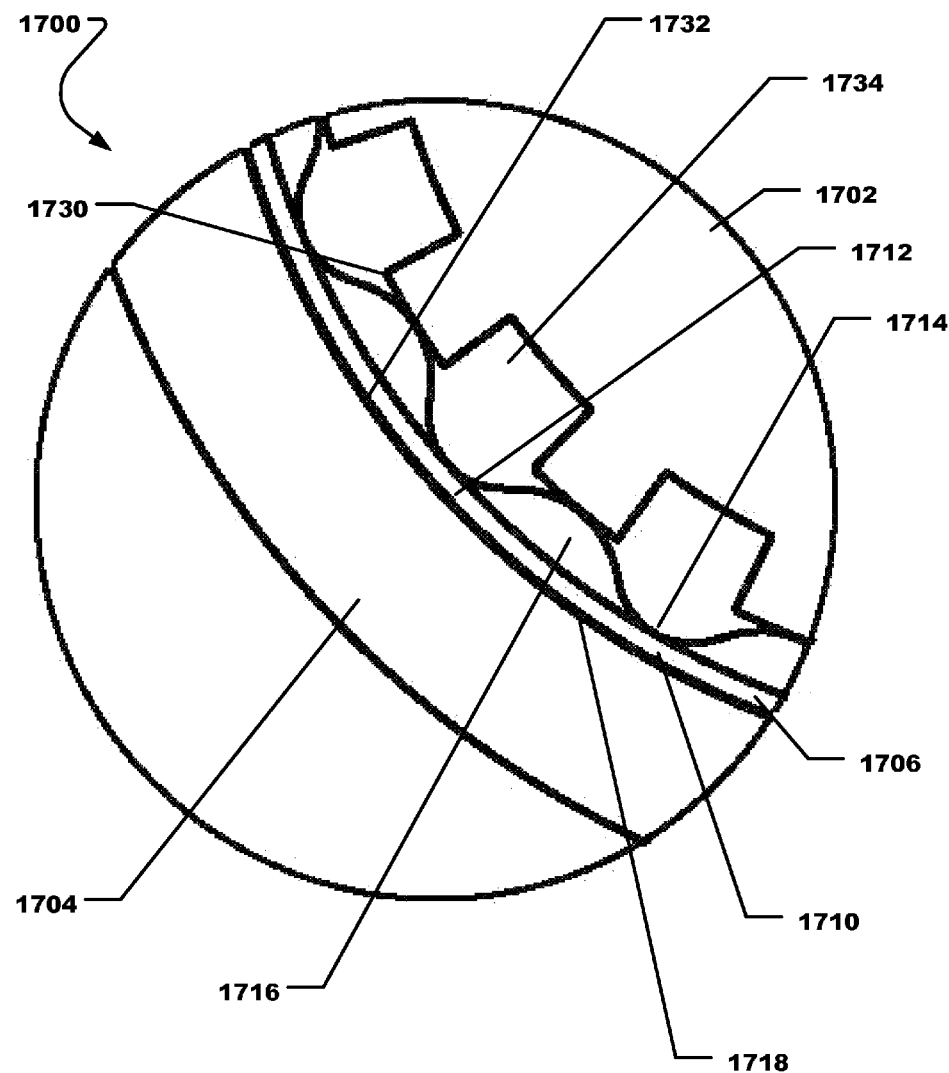
FIG. 18 includes a detailed view, taken at Circle 18 in FIG. 17, of the rotating assembly in the engaged configuration in accordance with yet another embodiment.

In the engaged configuration, illustrated in FIG. 17 and FIG. 18, the plurality of projections 1716 can engage the outer cylindrical surface 1730 of the inner component 1702, e.g., the portions of the outer cylindrical surface 1730 located between each void 1734. The outer surface 1718 of the sidewall 1712 of the body 1710 can engage the inner surface 1732 of the outer component 1704. Moreover, each projection 1716 can be compressed between the inner surface 1732 of the outer component 1704 and the outer surface 1730 of the inner component 1702 and can provide a plurality of radially directed forces that can statically couple the inner component 1702 and the outer component 1704 so the outer component 1704 can rotate with the inner component 1702.

In a particular aspect, each projection 1716 can include a stiffness, $S_P$, that can allow each projection 1716 to be compressed, but not permanently deformed in the engaged configuration. $S_P$ can be the same as $S_P$ described above in conjunction with the embodiment illustrated in FIG. 1 through FIG. 8.

Figure 19:
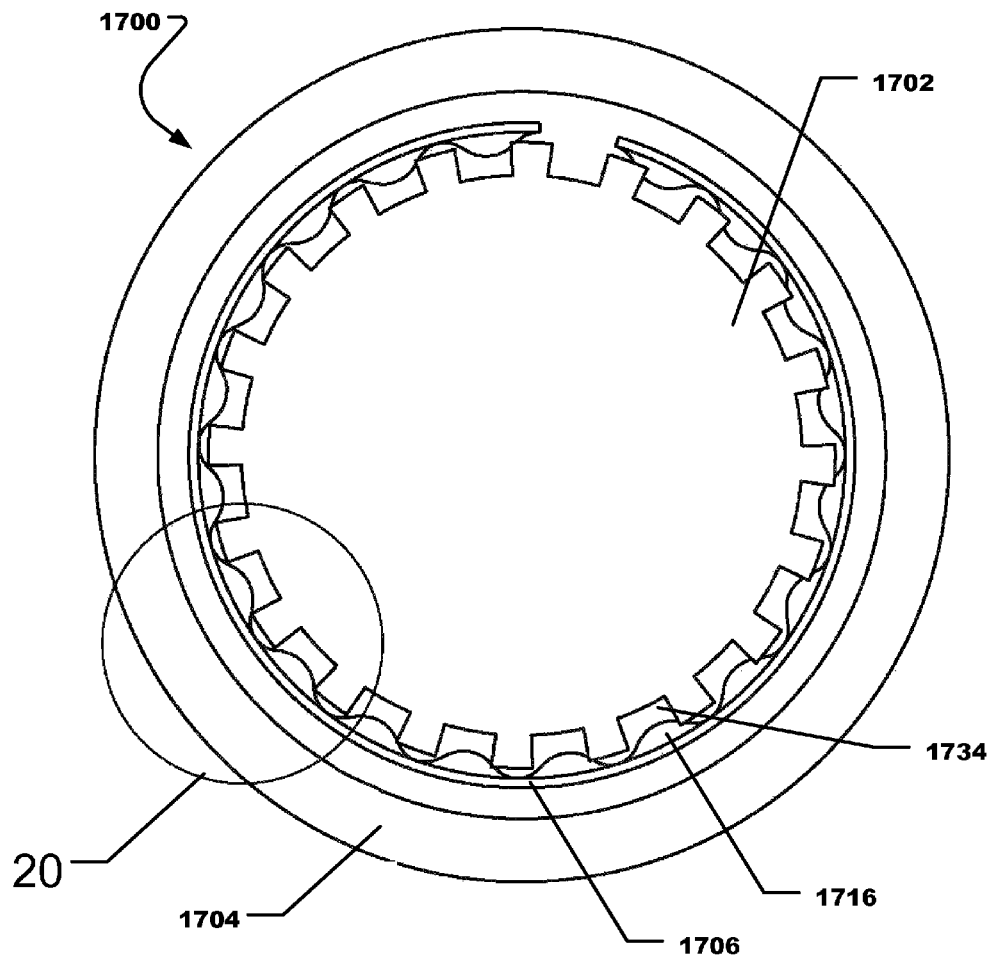
FIG. 19 includes an end plan view of the rotating assembly in a disengaged configuration in accordance with yet another embodiment.
Figure 20:
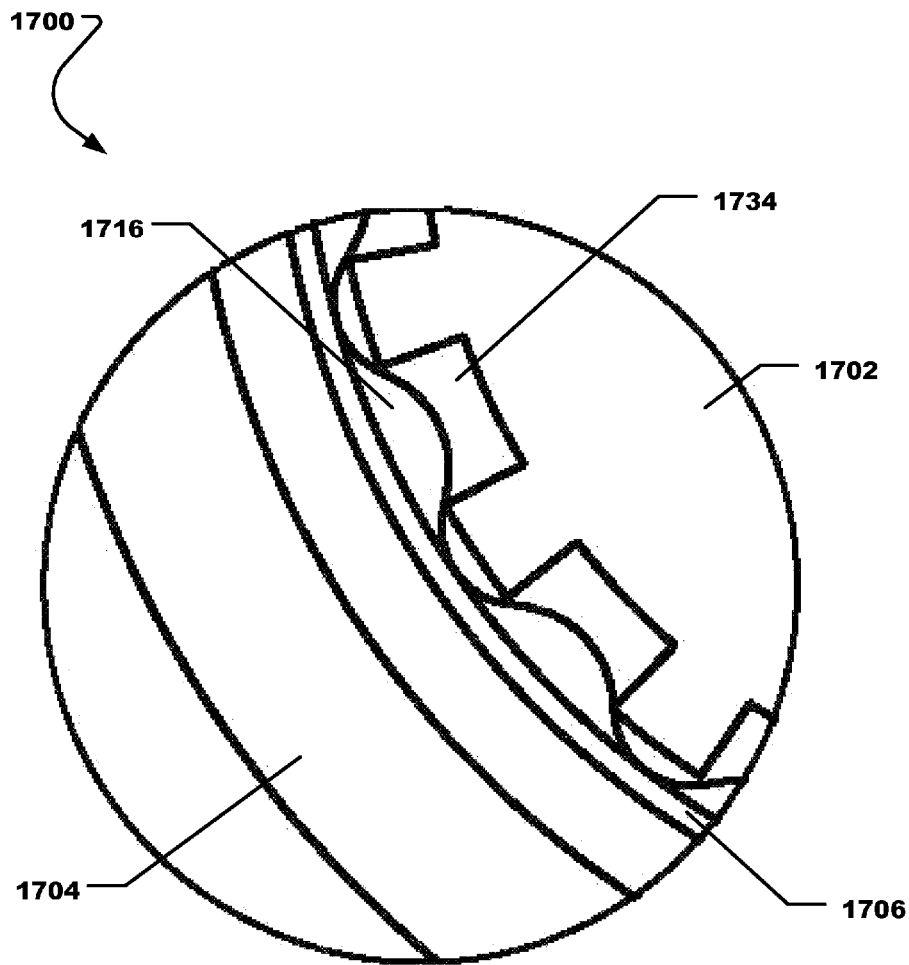
FIG. 20 includes a detailed view, taken at Circle 20 in FIG. 19, of the rotating assembly in the disengaged configuration in accordance with yet another embodiment.

In the disengaged configuration, depicted in FIG. 19 and FIG. 20, the plurality of projections 1716 can extend at least partially into the voids 1734 formed in the outer surface 1730 of the inner component 1702 and the torque limiting tolerance ring 1706 can contract radially inward. Specifically, each projection 1716 can extend at least partially into a respective void 1734 aligned therewith in the disengaged configuration. In a particular aspect, as the torque limiting tolerance ring 1706 contracts radially inward, the outer surface 1718 of the sidewall 1712 of the body 1710 can disengage the inner surface 1732 of the outer component 1704 and the outer surface 1718 of the sidewall 1712 can be radially spaced, or distanced, from the inner surface 1732 of the outer component 1704 around at least a majority of the circumference of the inner surface 1732 of the outer component 1704. In a particular aspect, a toroid of space can be formed around outer surface 1718 of the body 1710 of torque limiting tolerance ring 1706 and contact between the inner surface 1732 of the outer component 1704 and the outer surface 1718 of the torque limiting tolerance ring 1706.

In a particular aspect, the torque limiting tolerance ring 1706 can have a first diameter, $d_1$, in the engaged configuration and a second diameter, $d_2$, in the disengaged configuration. In this aspect, $d_1$ is different than $d_2$. Specifically, $d_2$ can be $<d_1$. For example, $d_2$ can be $\leq 99\%$ $d_2$, such as $\leq 98\%$ $d_2$, $\leq 97\%$ $d_2$, $\leq 96\%$ $d_2$, or $\leq 95\%$ $d_2$. Further, $d_2$ can be $\geq 70\%$ $d_1$, such as $\geq 75\%$ $d_1$, $\geq 80\%$ $d_1$, $\geq 85\%$ $d_1$, or $\geq 90\%$ $d_1$. In another aspect, $d_2$ can be within a range between and including any of the maximum and minimum values of $d_2$ described herein.

For example, $d_2$ can be $\leq 99\%$ $d_2$ and $\geq 70\%$ $d_1$, such as $\leq 99\%$ $d_2$ and $\geq 75\%$ $d_1$, $\leq 99\%$ $d_2$ and $\geq 80\%$ $d_1$, $\leq 99\%$ $d_2$ and $\geq 85\%$ $d_1$, or $\leq 99\%$ $d_2$ and $\geq 90\%$ $d_1$. Moreover, $d_2$ can be $\leq 98\%$ $d_2$ and $\geq 70\%$ $d_1$, such as $\leq 98\%$ $d_2$ and $\geq 75\%$ $d_1$, $\leq 98\%$ $d_2$ and $\geq 80\%$ $d_1$, $\leq 98\%$ $d_2$ and $\geq 85\%$ $d_1$, or $\leq 98\%$ $d_2$ and $\geq 90\%$ $d_1$. Further, $d_2$ can be $\leq 97\%$ $d_2$ and $\geq 70\%$ $d_1$, such as $\leq 97\%$ $d_2$ and $\geq 75\%$ $d_1$, $\leq 97\%$ $d_2$ and $\geq 80\%$ $d_1$, $\leq 97\%$ $d_2$ and $\geq 85\%$ $d_1$, or $\leq 97\%$ $d_2$ and $\geq 90\%$ $d_1$. Still further, $d_2$ can be $\leq 96\%$ $d_2$ and $\geq 70\%$ $d_1$, such as $\leq 96\%$ $d_2$ and $\geq 75\%$ $d_1$, $\leq 96\%$ $d_2$ and $\geq 80\%$ $d_1$, $\leq 96\%$ $d_2$ and $\geq 85\%$ $d_1$, or $\leq 96\%$ $d_2$ and $\geq 90\%$ $d_1$. Additionally, $d_2$ can be $\leq 95\%$ $d_2$ and $\geq 70\%$ $d_1$, such as $\leq 95\%$ $d_2$ and $\geq 75\%$ $d_1$, $\leq 95\%$ $d_2$ and $\geq 80\%$ $d_1$, $\leq 95\%$ $d_2$ and $\geq 85\%$ $d_1$, or $\leq 95\%$ $d_2$ and $\geq 90\%$ $d_1$.

In another particular aspect, the unformed section 1714 of the sidewall 1712 of the torque limiting tolerance ring 1706 can include a restoring force, $F_{RSW}$, that can bias the torque limiting tolerance ring 1706 radially inward from the engaged configuration to the disengaged configuration when the projections 1716 move into alignment with the voids 1734. $F_{RSW}$ can be the same as the restoring force described above in conjunction with the embodiment depicted in FIG. 1 through FIG. 8.

In a particular aspect, the torque limiting tolerance ring 1706 can slip and rotate on the inner component and move to the disengaged configuration if an operating torque, $T_O$, within the rotating assembly exceeds a threshold torque, $T_T$. A residual torque, $T_R$, acting on the inner component or the outer component can be the same as the residual torque values described above in conjunction with the embodiment illustrated in FIG. 1 through FIG. 8.

In a particular aspect, once the projections 1716 extending from the torque limiting tolerance ring 1706 move into and engage the voids 1734 formed in the inner component 1702, the projections 1716 cannot easily move out of the voids 1734 and the torque limiting tolerance ring 1706 can remain in the disengaged configuration after the torque limiting tolerance ring moves from the engaged configuration to the disengaged configuration.

In a particular aspect, each void 1734 can include a volume, $V_D$, measured within the space bound by one or more inner surfaces of the void 1734. Each projection 1716 can occupy a volume, $V_P$, measured within the space bound by one or more outer surfaces of the projection 1716 and $V_P$ can be $\leq V_D$, as described above in conjunction with the embodiment illustrated in FIG. 1 through FIG. 8.

In another aspect, each void 1734 can include a circumferential width, or diameter, $W_D$, measured at a widest portion of each void 1734. Each projection 1716 can also include a circumferential width, or diameter, $W_P$, measured at a widest portion of each projection the projection. $W_P$ can be $\leq W_D$, as described above in conjunction with the embodiment illustrated in FIG. 1 through FIG. 8. In another aspect, $W_P$ can be $\geq W_D$, as described above in conjunction with the embodiment illustrated in FIG. 1 through FIG. 8.

In another embodiment, not shown in the figures, but clearly within the scope of the present disclosure, a rotating assembly can include the inner component 1702 and the torque limiting tolerance ring 1706, illustrated in FIG. 17 through FIG. 20, and the outer component 104 and the torque limiting tolerance ring 106, illustrated in FIG. 1 through FIG. 8. In this assembly, the torque limiting tolerance ring 1706 can be considered the first torque limiting tolerance ring 1706 and the torque limiting tolerance ring 106 can be considered the second torque limiting tolerance ring 106.

In this embodiment of the rotating assembly, in the engaged configuration, the first torque limiting tolerance ring 1706 can be installed on the inner component 1702 so that the inwardly directed projections 1716 are engaged with the outer surface 1730 of the inner component 1702. The second torque limiting tolerance ring 106 can be installed around the first torque limiting tolerance ring 1706 so that the inner surface 118 of the second torque limiting tolerance ring 106 engages the outer surface 1718 of the first torque limiting tolerance ring 1706. The outer component 104 can be installed over the second torque limiting tolerance ring 106 so that the outwardly directed projections 116 of the second torque limiting tolerance ring 106 are engaged with the inner surface 132 of the outer component 104.

If the first torque limiting tolerance ring 1706 rotates with respect to the inner component 1702 and the projections 1716 on the first torque limiting tolerance ring 1706 are aligned with the voids 1734 formed in the inner component 1702, the first torque limiting tolerance ring 1706 can contract radially and move to the disengaged configuration, in which the outer surface 1718 of the first torque limiting tolerance ring 1706 is radially distanced from the inner surface 118 of the second torque limiting tolerance ring 106 around the circumference of the outer surface 1718 of the first torque limiting tolerance ring 1706. Similarly, if the second torque limiting tolerance ring 106 rotates with respect to the outer component 104 and the projections 116 on the second torque limiting tolerance ring 106 are aligned with the voids 134 formed in the outer component 104, the second torque limiting tolerance ring 106 can expand radially and move to the disengaged configuration, in which the inner surface 118 of the second torque limiting tolerance ring 106 is radially distanced from the outer surface 1718 of the first torque limiting tolerance ring 1706 around the circumference of the inner surface 118 of the second torque limiting tolerance ring 106. In other aspect, both torque limiting tolerance rings 1706, 106 can move to a disengaged configuration at essentially the same time. In any of the disengaged configurations, the outer component 104 can rotate freely with respect to the inner component 1702.

The combination of the first torque limiting tolerance ring 1706 and the second torque limiting tolerance ring 106 can also be installed within a rotating assembly having an inner component with an outer surface formed with voids and an outer component with an inner surface free of voids or a rotating assembly having an inner component with an outer surface free of voids and an outer component with an inner surface formed with voids. In each of these rotating assemblies, the combination of the first torque limiting tolerance ring 1706 and the second torque limiting tolerance ring 106 can either move to a disengaged configuration when the projections on the first torque limiting tolerance ring are aligned with voids formed in outer surface of the inner component or the projections on the second torque limiting tolerance ring 106 are aligned with the voids formed in the inner surface of the outer component.

In another aspect, not shown in the figures, but clearly within the scope of the present disclosure, the first torque limiting tolerance ring 1706 and the second torque limiting tolerance ring 106 can be integrally formed as a single torque limiting tolerance ring that can have both inwardly and outwardly directed projections. Such a torque limiting tolerance ring can be installed within a rotating assembly having an inner component with an outer surface formed with voids and an outer component with an inner surface free of voids, a rotating assembly having an inner component with an outer surface free of voids and an outer component with an inner surface formed with voids, or a rotating assembly having an inner component with an outer surface formed with voids and an outer component with an inner surface formed with voids. In each of these rotating assemblies, the torque limiting tolerance ring can either move to a disengaged configuration when the inwardly directed projections on the torque limiting tolerance ring are aligned with the voids formed in the outer surface of the inner component, when the outwardly directed projections on the torque limiting tolerance ring are aligned with the voids formed in the inner surface of the outer component, or when the inwardly directed projections and/or the outwardly direction projections on the tolerance ring are aligned with the voids formed in the outer surface of the inner component and/or the voids formed in the inner surface of the outer component.

In each of the embodiments describe herein, each of the voids, regardless of orientation, can have a depth, $d_v$, into the inner component or the outer component. Each projection can extend into a respective void at a depth, $d_p$, and $d_p$ can be $\leq d_v$. For example, $d_p \leq 100\% \ d_v$, such as $\leq 95\% \ d_v$, $\leq 90\% \ d_v$, or $\leq 75\% \ d_v$. In another aspect, $d_p \geq 5\% \ d_v$, such as $\geq 10\% \ d_v$, $\geq 15\% \ d_v$, or $\geq 25\% \ d_v$. Further, $d_p$ can be within a range between and including any of the maximum and minimum values of $d_p$ described herein.

For example, $d_p$ can be $\leq 100\% \ d_v$ and $\geq 5\% \ d_v$, such as $\leq 100\% \ d_v$ and $\geq 10\% \ d_v$, $\leq 100\% \ d_v$ and $\geq 15\% \ d_v$, or $\leq 100\% \ d_v$ and $\geq 25\% \ d_v$. Moreover, $d_p$ can be $\leq 95\% \ d_v$ and $\geq 5\% \ d_v$, such as $\leq 95\% \ d_v$ and $\geq 10\% \ d_v$, $\leq 95\% \ d_v$ and $\geq 15\% \ d_v$, or $\leq 95\% \ d_v$ and $\geq 25\% \ d_v$. In another aspect, $d_p$ can be $\leq 90\% \ d_v$ and $\geq 5\% \ d_v$, such as $\leq 90\% \ d_v$ and $\geq 10\% \ d_v$, $\leq 90\% \ d_v$ and $\geq 15\% \ d_v$, or $\leq 90\% \ d_v$ and $\geq 25\% \ d_v$. Still further, $d_p$ can be $\leq 75\% \ d_v$ and $\geq 5\% \ d_v$, such as $\leq 75\% \ d_v$ and $\geq 10\% \ d_v$, $\leq 75\% \ d_v$ and $\geq 15\% \ d_v$, or $\leq 75\% \ d_v$ and $\geq 25\% \ d_v$.

In another particular aspect, each projection, regardless of orientation, i.e., radially inward or radially outward, can have a radial height, $h_p$, measured along a radial axis extending perpendicularly through a center axis of rotation of the assembly and the projection. In a particular aspect, $h_p$ can be $\leq 100\% \ d_v$, such as $\leq 95\% \ d_v$, $\leq 90\% \ d_v$, or $\leq 75\% \ d_v$. In another aspect, $h_p \geq 5\% \ d_v$, such as $\geq 10\% \ d_v$, $\geq 15\% \ d_v$, or $\geq 25\% \ d_v$. Further, $h_p$ can be within a range between and including any of the maximum and minimum values of $h_p$ described herein.

For example, $h_p$ can be $\leq 100\% \ d_v$ and $\geq 5\% \ d_v$, such as $\leq 100\% \ d_v$ and $\geq 10\% \ d_v$, $\leq 100\% \ d_v$ and $\geq 15\% \ d_v$, or $\leq 100\% \ d_v$ and $\geq 25\% \ d_v$. Moreover, $h_p$ can be $\leq 95\% \ d_v$ and $\geq 5\% \ d_v$, such as $\leq 95\% \ d_v$ and $\geq 10\% \ d_v$, $\leq 95\% \ d_v$ and $\geq 15\% \ d_v$, or $\leq 95\% \ d_v$ and $\geq 25\% \ d_v$. In another aspect, $h_p$ can be $\leq 90\% \ d_v$ and $\geq 5\% \ d_v$, such as $\leq 90\% \ d_v$ and $\geq 10\% \ d_v$, $\leq 90\% \ d_v$ and $\geq 15\% \ d_v$, or $\leq 90\% \ d_v$ and $\geq 25\% \ d_v$. Still further, $h_p$ can be $\leq 75\% \ d_v$ and $\geq 5\% \ d_v$, such as $\leq 75\% \ d_v$ and $\geq 10\% \ d_v$, $\leq 75\% \ d_v$ and $\geq 15\% \ d_v$, or $\leq 75\% \ d_v$ and $\geq 25\% \ d_v$.

In still another aspect, each projection can include an engagement height, $h_e$, that is a measure of the portion of the projection that extends into a respective void. In this aspect, $h_e$ can be $\leq 100\% \ h_p$, such as $\leq 95\% \ h_p$, $\leq 90\% \ h_p$, or $\leq 75\% \ h_p$. In another aspect, $h_e \geq 5\% \ h_p$, such as $\geq 10\% \ h_p$, $\geq 15\% \ h_p$, or $\geq 25\% \ h_p$. Further, $h_e$ can be within a range between and including any of the maximum and minimum values of $h_e$ described herein.

For example, $h_e$ can be $\leq 100\% \ h_p$ and $\geq 5\% \ h_p$, such as $\leq 100\% \ h_p$ and $\geq 10\% \ h_p$, $\leq 100\% \ h_p$ and $\geq 15\% \ h_p$, or $\leq 100\% \ h_p$ and $\geq 25\% \ h_p$. Moreover, $h_e$ can be $\leq 95\% \ h_p$ and $\geq 5\% \ h_p$, such as $\leq 95\% \ h_p$ and $\geq 10\% \ h_p$, $\leq 95\% \ h_p$ and $\geq 15\% \ h_p$, or $\leq 95\% \ h_p$ and $\geq 25\% \ h_p$. In another aspect, $h_e$ can be $\leq 90\% \ h_p$ and $\geq 5\% \ h_p$, such as $\leq 90\% \ h_p$ and $\geq 10\% \ h_p$, $\leq 90\% \ h_p$ and $\geq 15\% \ h_p$, or $\leq 90\% \ h_p$ and $\geq 25\% \ h_p$. Still further, $h_e$ can be $\leq 75\% \ h_p$ and $\geq 5\% \ h_p$, such as $\leq 75\% \ h_p$ and $\geq 10\% \ h_p$, $\leq 75\% \ h_p$ and $\geq 15\% \ h_p$, or $\leq 75\% \ h_p$ and $\geq 25\% \ h_p$.

As illustrated in the various figures, each void can have a cross-sectional shape within a cross-section taken perpendicular to an axis of rotation of the assembly that is generally rectangular or square. In another aspect, each void can have a cross-sectional shape that is rounded, e.g., arch-shaped or semi-circular. In yet another aspect, each void can have a cross-sectional shape that is generally triangular. Further, each void can have a cross-sectional shape that is generally shaped like an isosceles trapezoid.

Each projection can have a cross-sectional shape within a cross-section taken perpendicular to an axis of rotation of the assembly that is generally rounded, e.g., arch-shaped or semi-circular. In another aspect, each projection can have a cross-sectional shape that is rectangular or square. In yet another aspect, each projection can have a cross-sectional shape that is generally triangular. Further, each projection can have a cross-sectional shape that is generally shaped like an isosceles trapezoid. Each projection can have the same shape as a respective void. Alternatively, each projection can have a shape that is different than the shape of a respective void.

Depending on the application, all of the projections can be shaped the same or the projections can have varying shapes. Further, all of the voids can be shaped the same or the voids can have varying shapes. Certain shapes of the projections can promote slipping of the torque limiting tolerance ring when the threshold torque is reached. Additionally, certain shapes of the projections can promote retention of the torque limiting tolerance ring in the disengaged configuration.

In a particular aspect, a torque limiting tolerance ring according to any of the aspects described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring can be formed can have a thickness, t, and t can be ≥0.05 mm, such as ≥0.1 mm, ≥0.2 mm, ≥0.3 mm, or ≥0.4 mm. In another aspect, t can be ≤1.0 mm, such as ≤0.75 mm, or ≤0.5 mm. Moreover, t can be within a range between, and including, any of the maximum and minimum values of t disclosed above.

For example, t can be ≥0.05 mm and ≤1.0 mm, such as ≥0.05 mm and ≤0.75 mm, or ≥0.05 mm and ≤0.5 mm. Further, t can be ≥0.1 mm and ≤1.0 mm, such as ≥0.1 mm and ≤0.75 mm, or ≥0.1 mm and ≤0.5 mm. In another aspect, t can be ≥0.2 mm and ≤1.0 mm, such as ≥0.2 mm and ≤0.75 mm, or ≥0.2 mm and ≤0.5 mm. Moreover, t can be ≥0.3 mm and ≤1.0 mm, such as ≥0.3 mm and ≤0.75 mm, or ≥0.3 mm and ≤0.5 mm. In addition, t can be ≥0.4 mm and ≤1.0 mm, such as ≥0.4 mm and ≤0.75 mm, or ≥0.4 mm and ≤0.5 mm.

The tolerance ring according to any of the aspects described herein may have an overall outer diameter, OD, and OD can be ≥5 mm, such as ≥10 mm, ≥20 mm, ≥30 mm, or ≥40 mm. The OD can be ≤100 mm, such as ≤90 mm, ≤80 mm, ≤70 mm, ≤60 mm, or ≤50 mm. OD can be within a range between and including any of the maximum and minimum values of OD described herein.

For example, OD can be ≥5 mm and ≤100 mm, such as ≥5 mm and ≤90 mm, ≥5 mm and ≤80 mm, ≥5 mm and ≤70 mm, ≥5 mm and ≤60 mm, or ≥5 mm and ≤50 mm. OD can be ≥10 mm and ≤100 mm, such as ≥10 mm and ≤90 mm, ≥10 mm and ≤80 mm, ≥10 mm and ≤70 mm, ≥10 mm and ≤60 mm, or ≥10 mm and ≤50 mm. OD can be ≥20 mm and ≤100 mm, such as ≥20 mm and ≤90 mm, ≥20 mm and ≤80 mm, ≥20 mm and ≤70 mm, ≥20 mm and ≤60 mm, or ≥20 mm and ≤50 mm. Further, OD can be ≥30 mm and ≤100 mm, such as ≥30 mm and ≤90 mm, ≥30 mm and ≤80 mm, ≥30 mm and ≤70 mm, ≥30 mm and ≤60 mm, or ≥30 mm and ≤50 mm. Additionally, OD can be ≥40 mm and ≤100 mm, such as ≥40 mm and ≤90 mm, ≥40 mm and ≤80 mm, ≥40 mm and ≤70 mm, ≥40 mm and ≤60 mm, or ≥40 mm and ≤50 mm.

In another aspect, the tolerance ring can have an overall axial length, L, and L can be ≥5 mm, such as ≥10 mm, or ≥15 mm. Additionally, L can be ≤50 mm, such as ≤40 mm, ≤30 mm, or ≤20 mm. Moreover, L can be within a range between and including any of the maximum and minimum values of L described above.

For example, L can be ≥5 mm and ≤50 mm, such as ≥5 mm and ≤40 mm, ≥5 mm and ≤30 mm, or ≥5 mm and ≤20 mm. Further, L can be ≥10 mm and ≤50 mm, such as ≥10 mm and ≤40 mm, ≥10 mm and ≤30 mm, or ≥5 mm and ≤20 mm. Still further, L can be ≥15 mm and ≤50 mm, such as ≥15 mm and ≤40 mm, ≥15 mm and ≤30 mm, or ≥15 mm and ≤20 mm.

In another aspect, each projection can have a radial height, $H_R$, and $H_R$ can be ≥0.3 mm, such as ≥0.4 mm, ≥0.5 mm, ≥0.6 mm, or ≥0.7 mm. $H_R$ can also be ≤1.5 mm, such as ≤1.25 mm, or ≤1 mm. $H_R$ can also be within a range between and including any of the maximum and minimum vales of $H_R$ described herein.

For example, $H_R$ can be ≥0.3 mm and ≤1.5 mm, such as ≥0.3 mm and ≤1.25 mm, or ≥0.3 mm and ≤1 mm. Further, $H_R$ can be ≥0.4 mm and ≤1.5 mm, such as ≥0.4 mm and ≤1.25 mm, or ≥0.4 mm and ≤1 mm. $H_R$ can be ≥0.5 mm and ≤1.5 mm, such as ≥0.5 mm and ≤1.25 mm, or ≥0.5 mm and ≤1 mm. Moreover, $H_R$ can be ≥0.6 mm and ≤1.5 mm, such as ≥0.6 mm and ≤1.25 mm, or ≥0.6 mm and ≤1 mm. In addition, $H_R$ can be ≥0.7 mm and ≤1.5 mm, such as ≥0.7 mm and ≤1.25 mm, or ≥0.7 mm and ≤1 mm.

In particular embodiments, a torque limiting tolerance ring according to any of the aspects described herein can be inserted into an annular region defined between an inner component and an outer component. The annular region can have a thickness, $T_A$, as measured in the radial direction. The torque limiting tolerance ring can be adapted to occupy approximately 1.0 $T_A$ in at least three circumferential (contact) positions when engaged, and can also be adapted to span no greater than about 0.95 $T_A$ in any position (including the at least three circumferential positions) when disengaged.

In another aspect, the torque limiting tolerance ring can be adapted to span no greater than about 0.90 $T_A$ when disengaged, such as no greater than about 0.85 $T_A$, no greater than about 0.80 $T_A$, no greater than about 0.75 $T_A$, no greater than about 0.70 $T_A$, no greater than about 0.65 $T_A$, or no greater than about 0.60 $T_A$. Moreover, the torque limiting tolerance ring can be adapted such that when disengaged from the inner and outer components the torque limiting tolerance ring spans a distance between and including any of the $T_A$ values described above.

A torque limiting tolerance ring according to at least one of the embodiments described herein can be installed within an assembly as illustrated in FIG. 1 through FIG. 20. First, the torque limiting tolerance ring can be engaged with a first component, e.g., an inner or outer component, so that each one of a plurality of projections extending from a sidewall of the torque limiting tolerance ring is aligned with a surface portion between adjacent voids formed in a surface of the first component. Thereafter, a second component can be engaged with the torque limiting tolerance ring so that the torque limiting tolerance ring is between the first component and the second component. Moreover, a cylindrical surface on the torque limiting tolerance ring is engaged with a cylindrical surface on the second component and each of the plurality of projections on the torque limiting tolerance ring is compressed between the first component and the second component.

EXAMPLE

A torque limiting tolerance ring is manufactured from X10CrNi18-8 stainless steel stock. The stainless steel stock has a thickness of 0.4 mm±0.013. Further, the stainless steel stock has a VPN of 400-450 and is passivated according to the ASTM standard A967. The stainless steel stock is stamped to include a plurality of elongated projections equally spaced along the stainless steel stock. Each projection has a radial height of 1.3 mm. The stainless steel stock is rolled into cylinder and positioned around a shaft having an outer diameter of 43 mm. The formed torque limiting tolerance ring includes 11 elongated projections equally spaced around the circumference of the torque limiting tolerance ring and extending along an axial length of the torque limiting tolerance ring. Each projection has a radial height of 1.3 mm. Moreover, the torque limiting tolerance ring has an axial length of 15.75 mm.

An outer collar formed with a plurality of splines (radial depth of 8.8 mm) is installed around the torque limiting tolerance ring so that the projections engage the inner wall of the outer collar between the splines and the collar is statically coupled to the shaft. The outer collar has an inner diameter of 44.5 mm. The shaft is rotated while a braking force is applied to the outer collar and gradually increased. When the braking force reaches a critical value of approximately 71 Nm, a torque between the shaft and the collar reaches a threshold value that causes the tolerance ring to rotate within the collar. The torque limiting tolerance ring rotates within the collar until the projections on the torque limiting tolerance ring are aligned with the splines. Thereafter, the torque limiting tolerance ring expands radially outward and the projections extend into the splines. The torque limiting tolerance ring is then disengaged from the shaft and the shaft rotates freely within the collar.

A skilled artisan can recognize that there may be others applications that can utilize a torque limiting tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

Items.

Item 1. A torque limiting tolerance ring configured to be installed between an inner component and an outer component, the torque limiting tolerance ring, comprising:
   a generally cylindrical body having a sidewall, wherein the sidewall includes:
     an unformed section;
     a plurality of projections extending from the unformed section of the sidewall, wherein the plurality of projections are configured to engage the inner component or the outer component; and
   wherein the torque limiting tolerance ring is movable from an engaged configuration, in which the inner component is statically coupled to the outer component, to a disengaged configuration, in which the inner component is disengaged from the outer component.

Item 2. An assembly, comprising:
   an inner component;
   an outer component;
   a torque limiting tolerance ring installed between the inner component and the outer component, the torque limiting tolerance ring comprising:
     a generally cylindrical body having a sidewall, wherein the sidewall includes:
       an unformed section;
       a plurality of projections extending from the unformed section of the sidewall; and
   wherein the torque limiting tolerance ring is rotatable from an engaged configuration, in which the inner component is statically coupled to the outer component, to a disengaged configuration, in which the inner component is disengaged from the outer component.

Item 3. An air conditioner compressor assembly, comprising:
   a compressor shaft;
   a compressor pulley installed around the compressor shaft;
   a torque limiting tolerance ring installed between the compressor shaft and the compressor pulley, the torque limiting tolerance ring comprising:
     a generally cylindrical body having a sidewall, wherein the sidewall includes:
       an unformed section;
       a plurality of projections the unformed section; and
   wherein the torque limiting tolerance ring is rotatable from an engaged configuration, in which the compressor pulley is statically coupled to the compressor shaft, to a disengaged configuration, in which the compressor pulley is disengaged from the compressor shaft.

Item 4. An assembly, comprising:
   an inner component;
   an outer component at least partially surrounding the inner component, wherein the inner component comprises an outer cylindrical surface formed with a plurality of voids or the outer component comprises an inner cylindrical surface formed with a plurality of voids; and
   a torque limiting tolerance ring installed between the inner component and the outer component, the torque limiting tolerance ring comprising:
     a generally cylindrical body having a sidewall, wherein the sidewall includes:
       an unformed section;
       a plurality of projections extending radially inward or outward from the unformed section of the sidewall toward the voids formed in the inner component or toward the voids formed on the outer component.

Item 5. The torque limiting tolerance ring, the assembly, or the air conditioner compressor assembly according to any of items 1, 2, 3, or 4, wherein the torque limiting tolerance ring further comprises a gap in the unformed section, wherein the gap extends along a majority of the entire length of the body to establish at least a partial split in the body.

Item 6. The torque limiting tolerance ring, the assembly, or the air conditioner compressor assembly according to any of items 1, 2, 3, or 4, wherein the torque limiting tolerance ring further comprises a gap in the unformed section, wherein the gap extends along an entire length of the body to establish at least a complete split in the body.

Item 7. The torque limiting tolerance ring, the assembly, or the air conditioner compressor assembly according to any of items 1, 2, 3, or 4, wherein each projection is generally hemispherical.

Item 8. The torque limiting tolerance ring, the assembly, or the air conditioner compressor assembly according to any of items 1, 2, 3, or 4, wherein each projection is generally elongated and includes an axial height greater than a circumferential width.

Item 9. The torque limiting tolerance ring, the assembly, or the air conditioner compressor assembly according to any of items 1, 2, or 3, wherein the torque limiting tolerance ring comprises a first diameter, $d_1$, in the engaged configuration, and a second diameter, $d_2$, in the disengaged configuration and $d_1$ is different than $d_2$.

Item 10. The torque limiting tolerance ring, the assembly, or the air conditioner compressor according to item 9, wherein $d_1 \geq d_2$, such as $d_1 \geq 101\% \, d_2$, $\geq 102\% \, d_2$, $\geq 103\% \, d_2$, $\geq 104\% \, d_2$, or $\geq 105\% \, d_2$.

Item 11. The torque limiting tolerance ring, the assembly, or the air conditioner compressor according to item 10, wherein $d_1 \leq 130\% \, d_2$, such as $\leq 125\% \, d_2$, $\leq 120\% \, d_2$, $\leq 115\% \, d_2$, or $\leq 110\% \, d_2$.

Item 12. The torque limiting tolerance ring, the assembly, or the air conditioner compressor according to item 9, wherein $d_2 \geq d_1$, such as $d_2 \geq 101\% \, d_1$, $\geq 102\% \, d_1$, $\geq 103\% \, d_1$, $\geq 104\% \, d_1$, or $\geq 105\% \, d_1$.

Item 13. The torque limiting tolerance ring, the assembly, or the air conditioner compressor according to item 12, wherein $d_2 \leq 130\% \, d_1$, such as $\leq 125\% \, d_1$, $\leq 120\% \, d_1$, $\leq 115\% \, d_1$, or $\leq 110\% \, d_1$.

Item 14. The torque limiting tolerance ring, the assembly, or the air conditioner compressor assembly according to any of items 1, 2, or 3, wherein the torque limiting tolerance ring moves to the disengaged configuration if an operating torque, $T_O$, exceeds a threshold torque, $T_T$.

Item 15. The torque limiting tolerance ring, the assembly, or the air conditioner compressor assembly according to item 14, wherein in the disengaged configuration a residual torque, $T_R$, acting on the inner component or the outer component is $\leq 15\% \, T_T$, such as $\leq 12.5\% \, T_T$, $\leq 10\% \, T_T$, $\leq 7.5\% \, T_T$, $\leq 5\% \, T_T$, $\leq 2.5\% \, T_T$, or $\leq 1\% \, T_T$.

Item 16. The torque limiting tolerance ring, the assembly, or the air conditioner compressor assembly according to item 15, wherein $T_R$ is $\geq 0\% \, T_T$, such as $\geq 0.025\% \, T_T$, $\geq 0.05\% \, T_T$, $\geq 0.1 \, T_T$, $\geq 0.25\% \, T_T$, or $\geq 0.5\% \, T_T$.

Item 17. The torque limiting tolerance ring, the assembly, or the air conditioner compressor assembly according to any of items 1, 2, or 3, wherein the unformed section of the sidewall of the torque limiting tolerance ring includes a restoring force, $F_{RSW}$, that biases the torque limiting tolerance ring radially outward, or radially inward, to the disengaged configuration.

Item 18. The torque limiting tolerance ring, the assembly, or the air conditioner compressor assembly according to item 17, wherein $F_{RSW}$ is $\geq 5$ N, such as $\geq 10$ N, $\geq 15$ N, or $\geq 20$ N/m.

Item 19. The torque limiting tolerance ring, the assembly, or the air conditioner compressor assembly according to item 19, wherein $F_{RSW}$ is $\leq 50$ N, such as $\leq 45$ N, $\leq 40$ N, or $\leq 35$ N.

Item 20. The torque limiting tolerance ring, the assembly, or the air conditioner compressor assembly according to any of items 1, 2, or 3, wherein each projection comprises a stiffness, $S_P$, that allows each projection to be compressed, but not permanently deformed in the engaged configuration.

Item 21. The torque limiting tolerance ring, the assembly, or the air conditioner compressor assembly according to item 20, wherein $S_P$, is $\geq 500$ kN/mm, such as $\geq 1000$ kN/mm, $\geq 5000$ kN/mm, or $\geq 10000$ kN/mm.

Item 22. The torque limiting tolerance ring, the assembly, or the air conditioner compressor assembly according to item 21, wherein $S_P$, is $\leq 500000$ kN/mm, such as $\leq 250000$ kN/mm, $\leq 100000$ kN/mm, or $\leq 50000$ kN/mm.

Item 23. The torque limiting tolerance ring, the assembly, or the air conditioner compressor assembly according to any of items 1, 2, or 3, wherein the torque limiting tolerance ring remains in the disengaged configuration after the torque limiting tolerance ring moves from the engaged configuration to the disengaged configuration.

Item 24. The assembly according to item 4, wherein the torque limiting tolerance ring is rotatable from an engaged configuration, in which the inner component is statically coupled to the outer component, to a disengaged configuration, in which the inner component is disengaged from the outer component.

Item 25. The assembly according to item 24, wherein in the engaged configuration, the plurality of projections engage the outer cylindrical surface of the inner component or the inner cylindrical surface of the outer component.

Item 26. The assembly according to item 24, wherein in the disengaged configuration, the plurality of projections extend at least partially into the voids formed in the inner component or the voids formed in the outer component.

Item 27. The assembly according to item 4, wherein each void includes an axial spline extending parallel to a longitudinal axis.

Item 28. The assembly according to item 4, wherein each void includes a bore extending radially inward or radially outward with respect to a longitudinal axis.

Item 29. The assembly according to item 4, wherein each void comprises a volume, $V_D$, measured within the space bound by one or more inner surfaces of the void, and each projection occupies a volume, $V_P$, measured within the space bound by one or more outer surfaces of the projection and $V_P \leq V_D$.

Item 30. The assembly according to item 29, wherein $V_P \leq 99\% \, V_D$, such as $\leq 98\% \, V_D$, $\leq 97\% \, V_D$, $\leq 96\% \, V_D$, or $\leq 95\% \, V_D$.

Item 31. The assembly according to item 30, wherein $V_P \geq 20\% \, V_D$, such as $\geq 30\% \, V_D$, $\geq 40\% \, V_D$, $\geq 50\% \, V_D$, or $\geq 75\% \, V_D$.

Item 32. The assembly according to item 4, wherein each void comprises a circumferential width, $W_D$, measured at a widest portion of each void, and each projection comprises a circumferential width, $W_P$, measured at a widest portion of each projection the projection and $W_P \leq W_D$.

Item 33. The assembly according to item 32, wherein $W_P \leq 99\% \, W_D$, such as $\leq 98\% \, W_D$, $\leq 97\% \, W_D$, $\leq 96\% \, W_D$, or $\leq 95\% \, W_D$.

Item 34. The assembly according to item 33, wherein $W_P \geq 50\% \, W_D$, such as $\geq 60\% \, W_D$, $\geq 70\% \, W_D$, or $\geq 80\% \, W_D$.

Item 35. The assembly according to item 4, wherein each void comprises a circumferential width, $W_D$, measured at a widest portion of each void, and each projection comprises a circumferential width, $W_P$, measured at a widest portion of each projection and $W_P \geq W_D$.

Item 36. The assembly according to item 35, wherein $W_P \geq 101\% \, W_D$, such as $\geq 102\% \, W_D$, $\geq 103\% \, W_D$, $\geq 104\% \, W_D$, or $\geq 105\% \, W_D$.

Item 37. The assembly according to item 36, wherein $W_P \leq 125\% \, W_D$, such as $\leq 120\% \, W_D$, or $\leq 115\% \, W_D$.

Item 38. A method of installing a torque limiting tolerance ring, the method comprising:

engaging the torque limiting tolerance ring with a first component so that each one of a plurality of projections extending from a sidewall of the torque limiting tolerance ring is aligned with a surface portion between adjacent voids formed in a surface of the first component; and engaging a second component with the torque limiting tolerance ring so that the torque limiting tolerance ring is between the first component and the second component, a cylindrical surface on the torque limiting tolerance ring is engaged with a cylindrical surface on the second component, and each of the plurality of projections on the torque limiting tolerance ring is compressed between the first component and the second component.

Item 39. An assembly comprising:

an inner component;

an outer component at least partially surrounding the inner component, the inner and outer components defining an annular region having a radial thickness, $T_A$; and a torque limiting tolerance ring installed within the annular region, wherein the torque limiting tolerance ring is adapted to occupy approximately $1.0\,T_A$, in at least three circumferential positions when engaged, and wherein the torque limiting tolerance ring spans no greater than about $0.95\,T_A$ in any position when disengaged.

Item 40. A torque limiting tolerance ring adapted to be installed between an inner component and an outer component, wherein the inner and outer components define an annular region located therebetween having a radial thickness, $T_A$, wherein in an engaged configuration the torque limiting tolerance ring is adapted to span between the inner and outer components a distance, $T_A$, and wherein in a disengaged configuration the torque limiting tolerance ring is adapted to span between the inner and outer components a distance no greater than about $0.99\,T_A$, no greater than about $0.90\,T_A$, no greater than about $0.85\,T_A$, no greater than about $0.80\,T_A$, no greater than about $0.75\,T_A$, no greater than about $0.70\,T_A$, no greater than about $0.65\,T_A$, or no greater than about $0.60\,T_A$.

What is claimed is:

1. An assembly, comprising:

an inner component;

an outer component at least partially surrounding the inner component, wherein the inner component comprises an outer cylindrical surface formed with a plurality of voids or the outer component comprises an inner cylindrical surface formed with a plurality of voids; and a torque limiting tolerance ring installed between the inner component and the outer component, the torque limiting tolerance ring comprising:

a generally cylindrical body having a sidewall, wherein the sidewall includes:

an unformed section;

a plurality of projections extending radially inward or outward from the unformed section of the sidewall toward the voids formed in the inner component or toward the voids formed on the outer component, wherein the torque limiting tolerance ring is rotatable between an engaged configuration, in which the inner component is coupled to the outer component, and a disengaged configuration, in which the inner component is disengaged from the outer component, wherein the plurality of projections engage the inner or outer cylindrical surface of the outer or inner component in the engaged configuration, and wherein the plurality of projections extend at least partially into the voids formed in the inner or outer component in the disengaged configuration.

2. The assembly according to claim 1, wherein each void includes a bore extending radially inward or radially outward with respect to a longitudinal axis.

3. The assembly according to claim 1, wherein each void comprises a circumferential width, $W_D$, measured at a widest portion of each void, and each projection comprises a circumferential width, $W_P$, measured at a widest portion of each projection the projection and $W_P \leq W_D$.

4. The assembly according to claim 1, wherein each void comprises a circumferential width, $W_D$, measured at a widest portion of each void, and each projection comprises a circumferential width, $W_P$, measured at a widest portion of each projection and $W_P \geq W_D$.

5. The assembly according to claim 1, wherein the torque limiting tolerance ring comprises a metal.

6. The assembly according to claim 1, wherein the projections are equally spaced apart around a circumference of the torque limiting tolerance ring.

7. The assembly according to claim 1, wherein each projection has a rounded cross-sectional shape as viewed along a cross-section perpendicular to an axis of rotation of the assembly.

8. The assembly according to claim 1, wherein each of the plurality of voids does not fully penetrate the inner component or outer component.

* * * * *